United States Patent [19]

Seguin

[11] Patent Number: 5,689,523
[45] Date of Patent: Nov. 18, 1997

[54] EXCITATION SYSTEM FOR MULTI-CHANNEL LASERS

[76] Inventor: Herb J. J. Seguin, 12639 - 52 Ave., Edmonton, Alberta, Canada, T6H 0P6

[21] Appl. No.: 489,555

[22] Filed: Jun. 12, 1995

Related U.S. Application Data

[63] Continuation-in-part of Ser. No. 167,648, Dec. 14, 1993, abandoned.

[51] Int. Cl.$^6$ ........................................ H01S 3/097
[52] U.S. Cl. ........................ 372/82; 372/37; 372/92; 372/95; 372/18
[58] Field of Search ........................ 372/82, 37, 92, 372/95, 18

[56] References Cited

U.S. PATENT DOCUMENTS

| | | | |
|---|---|---|---|
| 3,873,942 | 3/1975 | Reilly | 331/94.5 |
| 4,697,271 | 9/1987 | Amano | 372/68 |
| 4,922,502 | 5/1990 | Unternahrer et al. | 372/66 |
| 5,029,173 | 7/1991 | Seguin | 372/61 |
| 5,210,768 | 5/1993 | Seguin | 372/92 |
| 5,386,431 | 1/1995 | Tulip | 372/68 |

FOREIGN PATENT DOCUMENTS

| | | |
|---|---|---|
| 1474277 | 7/1974 | Australia . |
| 0448319A2 | 3/1991 | European Pat. Off. . |
| 0448319A3 | 3/1991 | European Pat. Off. . |
| 0556977A1 | 2/1993 | European Pat. Off. . |
| 1556589 | 2/1968 | France . |

OTHER PUBLICATIONS

"High Power $CO_2$ Waveguide Laser of the 1 kW Category," Nowack, R. et al., *SPIE Lasers and Applications II* vol. 1276 (1990), pp. 18–25.

"Lateral and Transverse Mode Properties of $CO_2$ Slab Waveguide Lasers," Shackleton, C.J. et al. *Optics Communications* vol. 89 (1992), pp. 423–428.

"Planar Waveguide, 1kW cw, Carbon Dioxide Laser Excited by a Single Transverse rf Discharge," Colley, A.D. et al. *Appl. Phys. Lett.* vol. 61(2) (1992), pp. 136–138.

"Single–Mode Selection Using Coherent Imaging Within a Slab Waveguide $CO_2$ Laser," Abramski, K.M. et al. *Appl. Phys. Lett.* vol. 60(20) (1992), pp. 2469–2471.

"Phase–Locked $CO_2$ Laser Array Using Diagonal Coupling of Waveguide Channels," Abramski, K.M., et al. *Appl. Phys. Lett.* vol. 60(5) (1992), pp. 530–532.

"Staggered Hollow–Bore $CO_2$ Waveguide Laser Array," Hart, R.A. et al. *Appl. Phys. Lett.* vol. 4(2) (1978), pp. 1057–1059.

(List continued on next page.)

*Primary Examiner*—Leon Scott, Jr.
*Attorney, Agent, or Firm*—Frank J. Dykas

[57] ABSTRACT

An excitation system for a gas laser featuring a multiplicity of gain channels uses a resonant cavity to provide broad band RF power division and impedance matching to the multiplicity of gain channels. Integral anode and grid resonant tank circuits featuring positive feedback may be employed to provide a self-excited power oscillator having a very high power capability with good efficiency at low cost. A smaller and higher frequency multi-channel excitation system fabricated from stripline resonator elements may be used for driving small scale multi-channel lasers. A common optical extraction system features either a stable, an unstable, or a hybrid optical cavity mode, with phase-locked or non-phase locked output performance, achieved via external or self-injection.

43 Claims, 34 Drawing Sheets

OTHER PUBLICATIONS

"Multibeam cw Gas–Discharge $CO_2$ Laser Iglan–3," Kozlov, G.I. et al. *Sob. J. Quantum Electron* vol. 15(3) (1985), pp. 362–367.

"High Power Coupled $CO_2$ Waveguide Laser Array," Newman, L.A. et al. *Appl. Phys. Lett* vol. 48(25) (1986), pp. 1701–1703.

"Compact Diffusion–cooled Array and Slab Carbon Dioxide Laser at the kWatt Level," Abramski, K.M. et al. *Proceedings of LAMP '92* (1992), pp. 73–76.

"Triple Slab Ratio–frequency Discharged $CO_3$ Laser," Lapucci, A. et al. *Appl. Phys. Lett.* vol. 62 No. 1 (1993), pp. 7–8.

"A Novel Stable–unstable Resonator For Beam Control of Rare–gas Halide Lasers," Bourne, O.L. et al. *Optics Communications* vol. 31 No. 2(1979), pp. 193–195.

"Toric Unstable Resonators," Ferguson T.R. et al. *Applied Optics* vol. 23 No. 13 (1984), pp. 2122–2126.

"Unstable–stable Resonators With Toroidal Mirrors," Borghese, A. et al. *Applied Optics* vol. 20 No. 20 (1981), pp. 3547–3552.

"Annular–coupled Concave–convex Stable Resonator for Large–volume High–quality Energy Extraction," Cheng, Z. et al. Reprint from *Applied Optics* vol. 27 No. 5 (1988), pp. 836–842.

"Injection–Locking Unstable Resonator Excimer Lasers," Bigio, I.J. et al. *IEEE Journal of Quantrum Electronics* vol. QE–19 No. 9 (1983), pp. 1426–1436.

"Conditions for Stable Coherent Operation of Two $CO_2$ Lasers With Unstable Resonators," Antyukhov, V.V. et al. *Sov. J. Quantum Electron*, vol. 19(12) (1989), pp. 1582–1586.

"CW Injection Phase Locking in Homogeneously Broadened Media II. Phase Locking an Tunability of $CO_2$ Waveguide Lasers," Bourdet, G.L. et al. *Appl. Phys. B* vol. 43 (1987), pp. 273–279.

"Use of a Spatial Filter for Phase Locking of a Laser Array," Golubentsev, A.A. et al. *Sov. J. Quantum Electron*, vol. 20(8) (1990), pp. 934–937.

"Mutistability and Chaos in a Negative Feedback Laser," Grigor'eva, E.V. et al. *Sov. J. Quantum Electron.* vol. 20(8) (1990), pp. 938–942.

"Theory of Phase Locking of an Array of Lasers," Golubentsev, A.A. et al. *Sov. Phys. JETP* vol. 66(4) (1987), pp. 676–682.

"Principles of Microwave Circuits. MIT Lab Ferries," Montgomery, C.G. et al. *Resonant Cavities* Chapter 7, McGaw–Hill (1948), pp. 216–229.

"Basic Circuit Phenomena at High Frequencies," Knipp, J.K. *Cavity Resonators* Chapter 4 (1948), pp. 70–94.

"Technical Memorandum. Wide–gap Re–entrant Cavity Resonators for 900–1500 MHz," Howson, D.P. *IEEE Proceedings* vol. 131 pt H. No. 6 (1984) pp. 34197H–3421H.

"Miniaturized Hairpin Resonator Filters and Their Application to Receiver Front–End MIC's," Sagawa, M. et al. *IEEE Transactions on Microwave Theory and Techniques* vol. 37 No. 12 (1989) pp. 1991–1996.

"Design of Microwave Oscillators and Filters Using Transmission–Mode Dielectric Resonators Coupled to Microstrip Llines," Poldcameni, A. et al. *IEEE Transactions on Microwave Theory and Techniques* vol. MTT033 No. 12 (1985), pp. 1329–1332.

"Microwave Electronics," Slater, J.C. *The Klystron* Chapter 10 (1950), pp. 232–239.

Kuper, J.B.H. *Space–Charge Devices as Microwave Amplifiers*, Chapter 6 (1948), pp. 146–167.

Kuper, J.B.H. *Microwave Triode Oscillators*, Chapter 7, pp. 170–198 (incomplete).

"High–Power Multibeam cw $CO_2$ Laser," Kozlov, G.I. *Sov. Tech Phys. Lett.* vol. 4(2) (1978), pp. 53–54.

Phase–locking phenomena in a radial multislot $CO_2$ laser array, E.F. Yelden, H.J.J. Seguin, C.E. Capjack, and H. Reshef, Department of Electrical Engineering, University of Alberta, a reprint from Journal of the Optical Society of America B, Copyright 1993 Optical Society of America, pp. 1475–1482.

Phase locking in a multichannel radial array $CO_2$ laser, E.F. Yelden, J.J.J. Seguin, C.E. Capjzck and H. Reshef, Apl. Phys. Lett. 62 (12), 22 Mar. 1993, Copyright 1993 American Institute of Physics, pp. 1311–1313.

Laser Injection Locking, Carl J. Buczek, Robert J. Freiberg, and M.L. Skolnick, Proceedings of the IEEE, vol. 61, No. 10, Oct. 1973, pp. 1411–1431.

Laser Receivers System Considerations and Configurations, Marie Ross, Laser Receivers, Devices Techniques and Systems, John Wiley, 1966, New York, pp. 362–365.

Laser Oscillation of $Nd_{0.14}Y_{0.86}P_5O_{14}$ Layers Epitaxially Grown on $Gd_{0.33}Y_{0.67}P_5O_{14}$ Substrates, W.W. Kruhler, R.D. Plattner, W. Fabian, P. Mockel and J.G. Grabmaier, Optics Communications, vol. 20, No. 3, Mar. 1977, pp. 354–355.

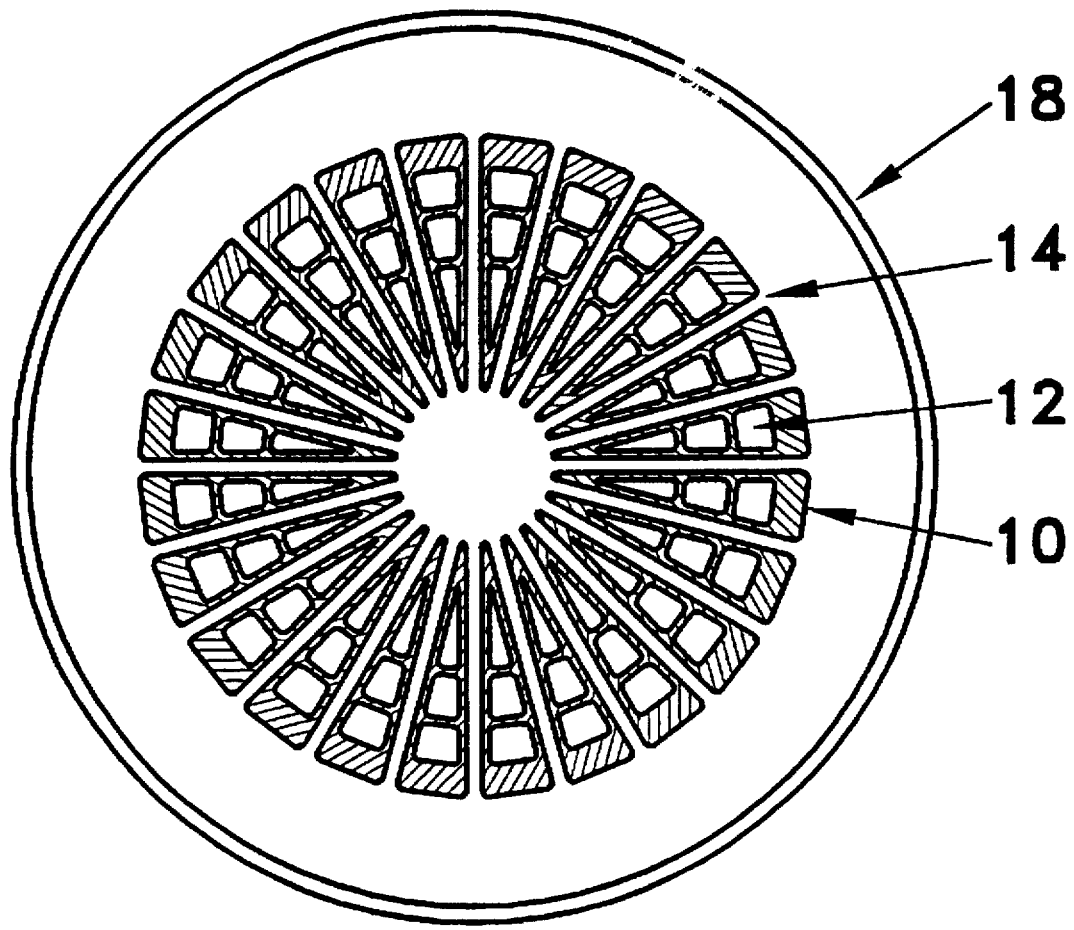
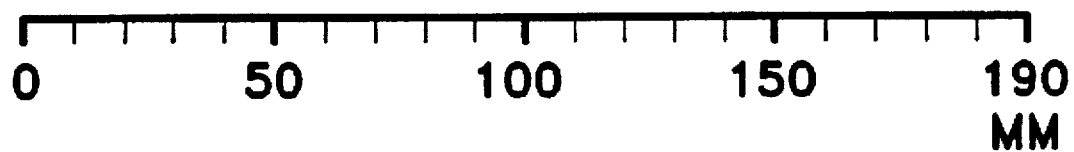
FIG.1

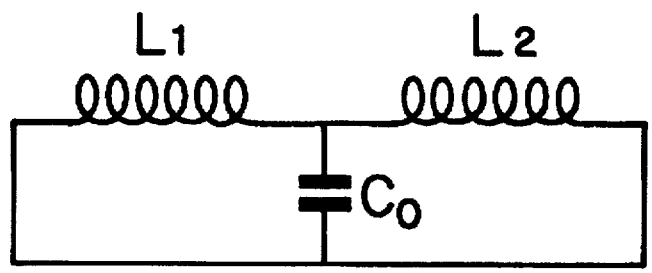
$$\omega^2 = \frac{1}{C_0 \left[\frac{L_1}{2}\right]}$$
FIG. 5-A
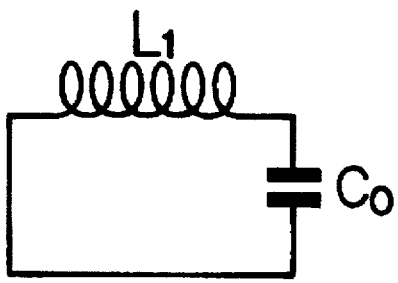
$$\omega^2 = \frac{1}{C_0 L_1}$$
FIG. 5-B
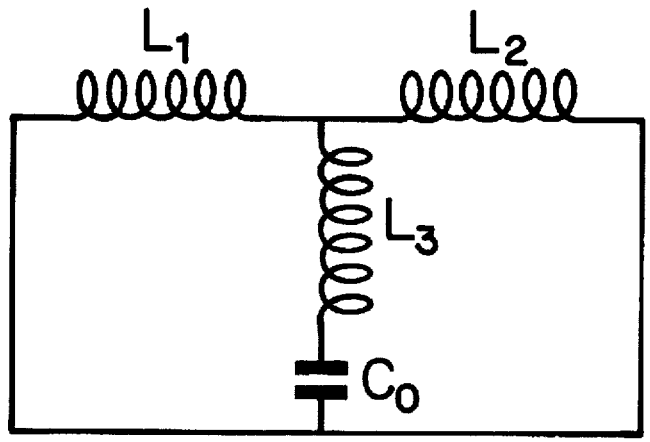
$$\omega^2 = \frac{1}{C_0 \left[\frac{L_1}{2} + L_3\right]}$$
FIG. 5-C

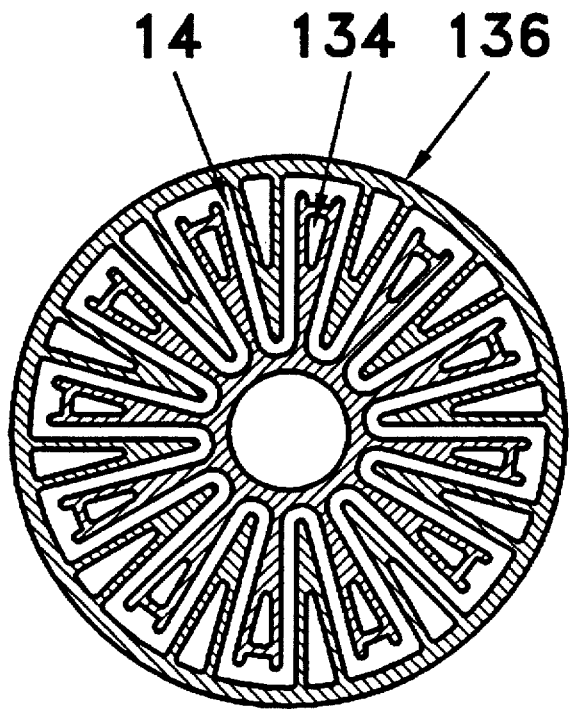
FIG.24A-1 — 24 SLOTS
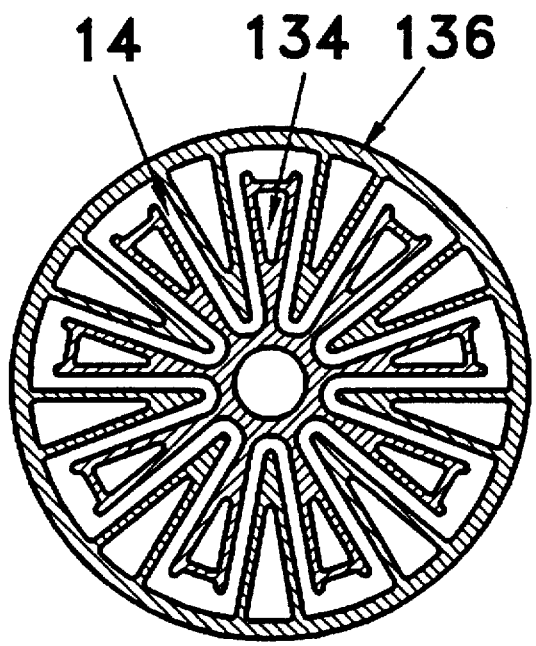
FIG.24A-2 — 18 SLOTS
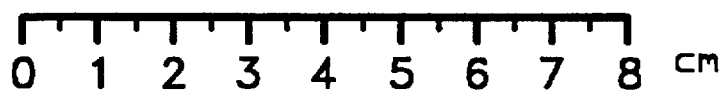
FIG.24A

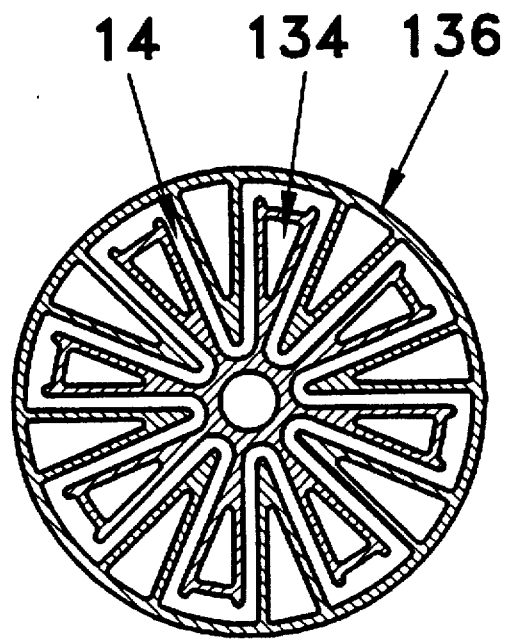
FIG.24B-1 — 16 SLOTS
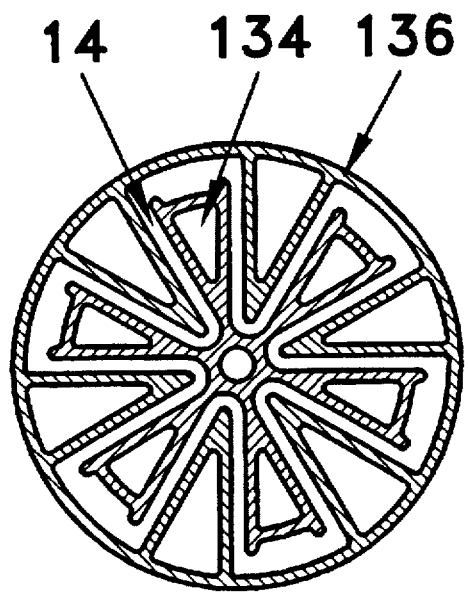
FIG.24B-2 — 12 SLOTS
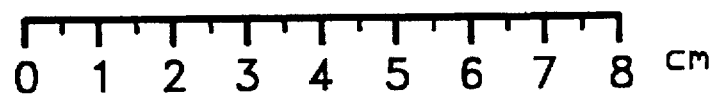
FIG.24B

EXCITATION SYSTEM FOR MULTI-CHANNEL LASERS

This application is a continuation-in-part of my prior, application, Ser. No. 08/167,648 filed Dec. 14, 1993, now abandoned Aug. 21, 1995 and entitled EXCITATION SYSTEM FOR MULTI-CHANNEL LASERS, the disclosure of which is hereby incorporated by reference thereto.

FIELD OF THE INVENTION

This invention relates to excitation and optical extraction systems for both high and low power gas discharge excited laser systems, and for multi-channel laser arrays, and particularly for radial array laser systems.

BACKGROUND AND SUMMARY OF THE INVENTION

The current trend in high power laser technology is away from gas-transport devices, convectively cooled by fast axial or transverse flow, to non-flow systems cooled by diffusion. The advantages derived from the switch from convention to diffusion cooling are major reductions in size, complexity and cost.

In this context, recent research and development work presented in the scientific and trade literature has documented that a new generation of simple, compact and relatively low cost CO2 laser systems can be realized through the adoption of extended-area, narrow-gap diffusion-cooled discharge structures, excited by RF energy sources.

Recent widened and lengthened versions of these single-slot RF driven devices, generally known generically as slab discharge lasers, have demonstrated sealed-off 10.6 micron output performance from a few watts up to the kW level and from physical packages an order of magnitude smaller than conventional gas transport machines. However, further scaling in output power from even wider single slabs has proven problematic; not only because of difficulties in impedance matching and uniform RF power deposition within these greatly extended area single-electrode gain media, but also because the elevated beam power density inherent in a single very-wide-slab becomes unmanageable for both mirrors and windows.

An additional troublesome and costly problem encountered in very-wide-slab devices is thermal distortion of the gain channel with concomitant mode instability, due to single-sided electrode heating and cooling. The progressively serious beam asymmetry and nonuniformity encountered in these much wider discharge structures also degrades the laser's effectiveness for precision industrial processing sequences, such as cutting and welding.

From the scenario above, it has become increasingly clear that the attainment of high quality laser output radiation at the multi-kilowatt level is not viable from a single very-wide-slab diffusion cooled device. Fortunately in this context, it has recently been demonstrated that the output power limitation of a single-slab laser device can be negated through adoption of an array excitation and optical extraction concept. The technique features a multi-gain channel approach, in which a large number of narrow-gap discharge geometries are incorporated into a single array optical system. When the individual beamlets from an array comprised of N laser channels are combined or stacked to form a single beam, a system having N times the average output power is achieved. In this manner an additional order of magnitude reduction in size or increase in power per unit volume can be realized. In the event that the individual lasers in the array can be uni-phase-locked, the focused intensity or brightness of the composite beam increases as $N^2$.

RF EXCITED PHASE LOCKED ARRAYS

Thus, a major challenge in narrow-gap diffusion cooled gas discharge pumped laser technology has become the design of multi-channel laser array geometries that are compatible with efficient RF power deposition, beamlet stacking, and uni-phase-locking. Although linear 1 and 2 dimensional arrays have recently been examined, beam stacking and phase locking problems render their outputs less than desirable.

RADIAL ARRAY

However, a radial geometry version of this multi-channel array approach, designated as the Zodiac (radial array) Laser structure, and documented in my U.S. Pat. No. 5,029,173 appears highly desirable, in terms of ease of manufacture, RF power deposition and phase locking. The compact and fully symmetric geometry also inherently negates temperature induced mechanical instabilities in both RF excitation and optical energy extraction subsystems.

Small scale, proof-of-concept experiments have demonstrated superior performance in cutting applications. Excellent performance has also been achieved even without phase locking, because of a major enhancement in output beam symmetry and reduction in focal spot size, due to a beneficial RADIAL BEAM STACKING phenomenon.

The concept is believed scalable to enormously high average and pulsed powers, and possibly to many hundreds of kilowatts, in an unusually small, sealed-off package, having no moving parts.

RADIAL ARRAY RF EXCITATION

An object of this patent disclosure is therefor to teach the efficient and cost effective extension of the basic multi-channel array concept into the realm of high powered laser devices through utilization of electromagnetic resonant cavity techniques for integrated generation, power division and impedance matching of RF energy into a multiplicity of electrodes comprising a laser array of arbitrary geometry, and particularly for the radial geometry typical of the radial array laser system.

RADIAL ARRAY OPTICAL ENERGY EXTRACTION

The approach also specifies DIFFRACTION-COUPLED-STABLE-RESONATOR and HYBRID-RESONATOR approaches for optical energy extraction. These new stable resonator optical extraction techniques may also be applied to other slab-type RF excited lasers, either single-channel or with multi-channel gain arrays, supporting a waveguide or non-waveguide mode of propagation, and using a variety of lasing gas mixtures such as CO2, CO, and Excimer. These optical concepts are also applicable to liquid and solid state laser gain media, pumped by either flashlamps or LED arrays.

There is thus provided in accordance with one aspect of the invention a laser system formed of plural slab type gain channels whose source of laser excitation energy for exciting the laser active media is coupled to the gain channels using a cavity type resonant circuit matched to each of the gain channels.

In one embodiment, the gain channels are confined by pairs of electrodes defining narrow-gap gas discharge regions and each pair of electrodes forms a transmission line. In another embodiment, the plural gain channels form a radial array having a common central axis and the resonant circuit has an axis of symmetry coinciding with the common central axis. The resonant circuit may form a resonant cavity, formed between inner and outer cylindrical electrical conductors. Such an embodiment preferably includes means at the end of each discharge channel to couple electrical energy back into the cavity and provide an impedance matched termination of the transmission lines formed by the electrodes, whereby upon excitation of the electrodes a travelling wave is formed. Preferably, magnetic loops disposed in the resonant cavity and electrically connected to the pairs of electrodes are used to couple energy to the electrodes from the cavity.

In a still further embodiment, the resonant circuit is formed from plural electrically conducting strips each forming a stripline excitation source.

The source of laser excitation energy preferably comprises a pair of co-axial re-entrant capacitively loaded concentric resonant cavities; and a vacuum tube electrically connected to the interior of the pair of co-axial re-entrant capacitively loaded concentric resonant cavities, thereby forming an rf oscillator, either mounted at one end of the cavity type resonant circuit or on the side of the cavity type resonant circuit to form a T. If the source is mounted on the side of the cavity type circuit, it may be formed from a multiplicity of vacuum tubes mounted on the side of the cavity type resonant circuit. In a still further embodiment, the source of laser excitation energy comprises a toroidal vacuum tube disposed within the cavity type resonant circuit and extending circumferentially about the radial array.

In a still further embodiment the invention provides a laser system comprising:

plural pairs of parallel electrodes faces, each pair of parallel electrodes faces defining a narrow-gap discharge channel:
  the pairs of parallel electrode faces being arranged about the extending radially from a first common central axis:
  means attached to said electrode faces for diffusion cooling of said electrode faces, such electrodes preferably being made from metallic or dielectric material selected for efficient heat transfer and having water cooling passages directly inside said electrode faces:
  means attached to the electrode faces for providing laser excitation energy to each pair of electrode faces, such that multiple laser gain media are created between the multiplicity of narrow-gap electrode channels:
  such multiple gap laser excitation energy being in the form of RF pumping energy derived from a power division and impedance transforming & matching system; comprising a resonant co-axial cavity structure, having a second central axis co-incident with the first common central axis, and mounted outside of and concentrically about the radial discharge channels:
  means for supply RF pumping energy into the co-axial cavity impedance & power transforming system, from either an external high power RF generator source, (vacuum tube or magnetron) or from integrated single or multiple RF amplifiers or self-excited cavity oscillators, built integrally into said co-axial impedance & power transforming resonant cavity system:
  optical energy extraction means, having a third central axis coinciding with the first common central axis, and being disposed at either end of the pairs of parallel electrode faces for generating a common resonator mode for all of the narrow-gap gain channels simultaneously.
  said optical extraction system comprising either: a toric resonator, with or without means for multiple phase-locked-feedback-loops and/or external master oscillator injection, for coherent or non-coherent multiple output beamlet coupling near the central axis,
  or: a conventional unstable resonator, featuring coherent over-the-edge diffractive output beamlet coupling, with coherence means between the individual output beamlets being derived through injection-phase-locking from either an external master oscillator or from the oscillator-core region established at the central region of the unstable resonator:

In a further embodiment of the invention the optical energy extraction means includes a phase-coherent annular-coupled concave-convex stable resonator, having a common stable cavity mode:

means for optical energy extraction from each narrow-gap gain channel featuring peripheral diffractive output coupling as individual phase-locked beamlets, one for reach radial gain channel and further comprising a plurality of identical small output windows disposed radially about and co-linearly with the multiplicity of gain channels:
  means for heating-sinking the plurality of radially mounted optical extraction windows.
  means for compacting the multiplicity of beamlets into a single compact optical beam, utilizing an axicon, or means for simultaneously focusing all beamlets to a common point utilizing a common focusing system such as a Wolter lense.

In a still further embodiment of the invention, the radial gain channels are mounted in an iris-coupled stable toric optical resonator featuring:

means for coherent phase-locked optical energy extraction as an annulus near the centerline of the structure.

In a still further embodiment of the invention, the radial gain channels are mounted in a MOPA optical extraction system featuring:

a centrally located Master Core Oscillator stable resonator, concentrically surrounded by a plurality of walk-off Power Amplifier gain sections, each power amplifier section providing an individual output beamlet phase locked with the central master oscillator, via simultaneously injection from the common centrally located master core oscillator.

In a lower power miniature embodiment of the invention, multi-channel laser excitation is supplied in the form of RF pumping energy derived from an impedance transforming and matching system; comprising multiple strip-line RF resonators all mutually coupled and having a second central axis co-incident with the first common central axis, and mounted outside of and concentrically about the radial discharge channels:

means for supply RF pumping energy into these coupled strip line resonators, from either an external RF generator source, or from integrated single or multiple RF amplifiers or self-excited oscillators, built integrally with said impedance transforming resonant strip line systems:
  means for extracting optical energy from all the gain channels simultaneously, such means featuring a common optical resonator, either a stable, unstable or hybrid optical resonator configuration, with either non-phase locked or fully phase locked multiple beamlet extraction, the latter derived via external master oscillator injection of self injection operation.

In a much higher output power embodiment of the invention plural radial multi-channel gain sections are mounted concentrically about a common central axis coincident with a third common optical resonator common axis, such that several hundred individual gain channels simultaneously contribute to the same optical output mode:

means attached to the electrode faces for providing diffusion cooling and laser excitation energy to each pair of electrode faces, such that efficient multiple laser gain media are created within the multiplicity of narrow-gap electrode channels:

such multiple gap laser excitation energy being in the form of RF pumping energy derived from a multi-magnetic loop impedance transforming and matching system; comprising a resonant co-axial cavity structure, having a second central axis co-incident with the first common central axis, and mounted outside of and concentrically about the radial discharge channels:

means for supply RF power to this co-axial RF cavity structure featuring several very high power RF power vacuum triodes or tetrodes mounted radially and integrally with the cavity structure such that the entire assembly has a distinct resonant RF frequency at which RF power is either generated or amplified within said RF cavity, and subsequently coupled to each electrode segment via a multiplicity of independent magnetic loops:

means for extracting optical energy from all of the gain channels simultaneously, such means featuring a common optical resonator of either a stable, unstable or hybrid optical resonator configuration, having either nonphase locked or fully phase locked multiple beamlet extraction, the latter derived via external master oscillator injection of self injection operation.

BRIEF DESCRIPTION OF THE FIGURES

There is now described preferred embodiments of the invention with reference to figures by way of example, in which figures like reference numbers denote similar features.

FIG. 5B shows electrical equivalent circuits for a capacitively loaded ¼ wavelength resonant RF cavity.

FIG. 5C shows electrical equivalent circuits for a capacitively loaded T section resonant RF cavity.

FIGS. 5A1–5A5 contain five typical electrical schematics showing various Rf drive magnetic loop configurations that may be employed.

FIG. 24, is a cross-sectional drawing for an alternative compound extruded electrode configuration suitable for construction of unusually compact medium powered radial array lasers.

DESCRIPTION OF PREFERRED EMBODIMENTS

Figure 2:
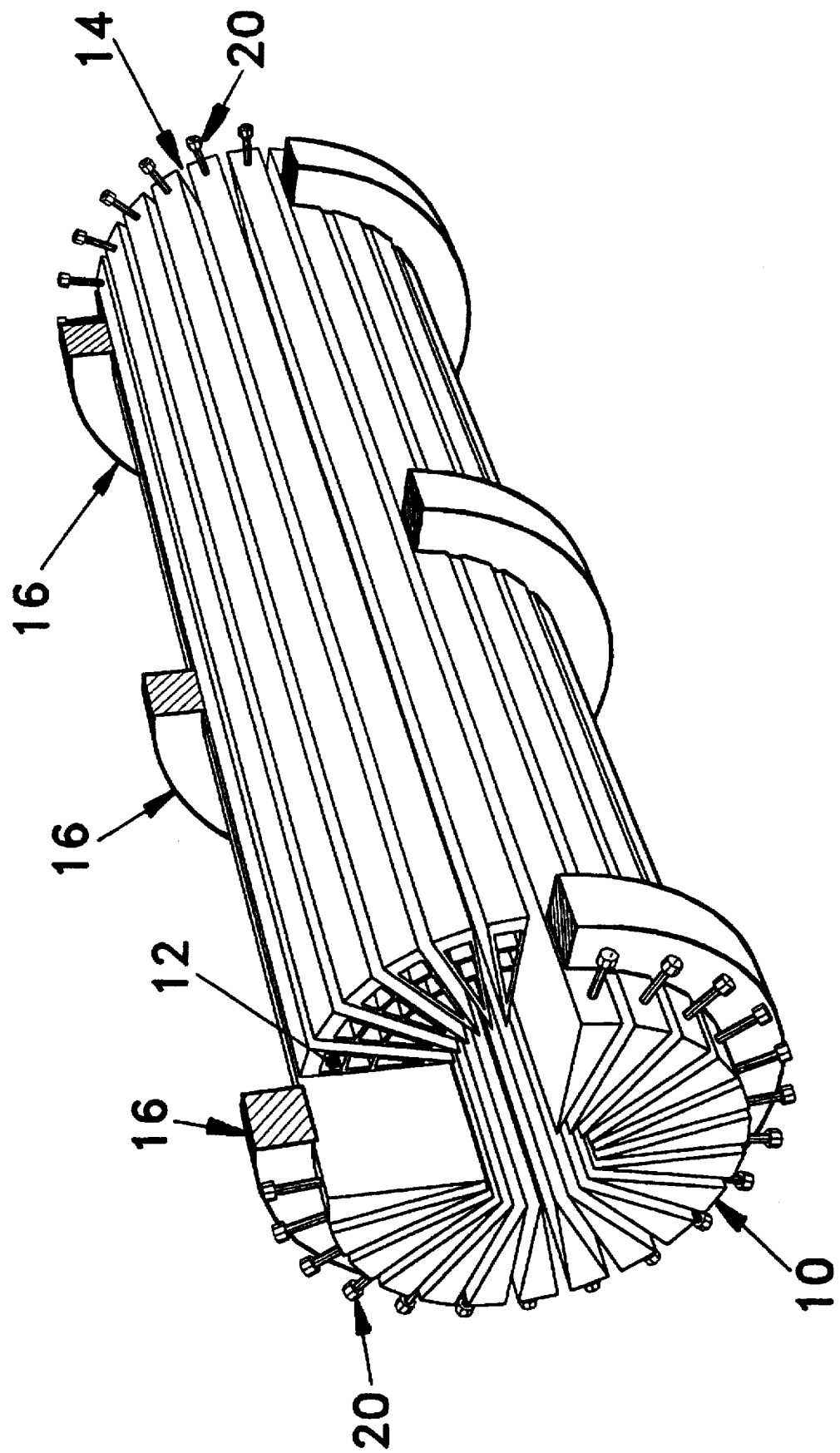
FIG. 2, is a perspective, partially cut away of a typical multi-channel radial array electrode structure for a high power laser.
Figures 1, 5A:
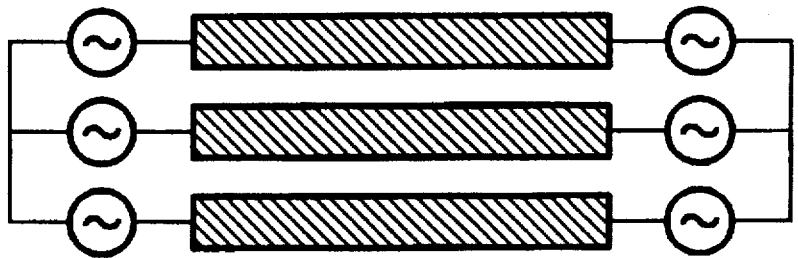
FIG. 1, is a cross-sectional schematic of a 24 slot radial array electrode system featuring extruded metallic electrodes having several internal water passages for efficient discharge cooling.
FIG. 5A, shows electrical equivalent circuits for: a capacitively loaded ½ wavelength resonant RF cavity.
Figures 2, 5A:
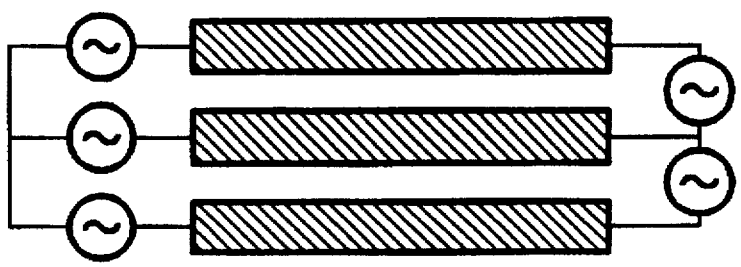
Figures 3, 5A:
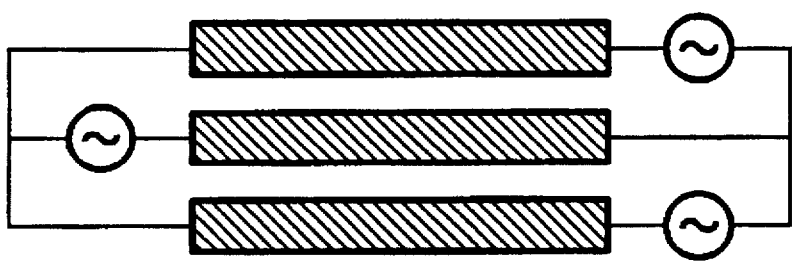
Figures 4, 5A:
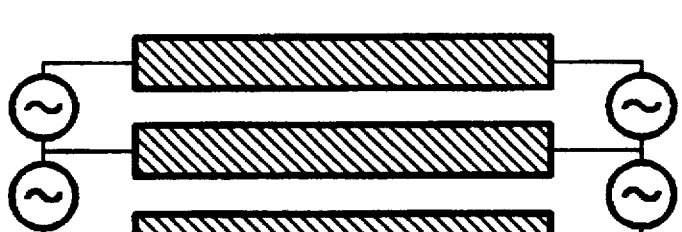

The basic multi-channel narrow-gap, RF driven laser excitation system under discussion is illustrated in the cross-sectional schematic diagram of FIG. 1. As outlined in my U.S. Pat. No. 5,029,173, the device is composed of a multiplicity of individual, diffusion-cooled gain channels mounted in a radial array. The typical multi-gain channel device depicted in FIGS. 1 and 2 is fabricated from thin-wall, wedge-shaped electrode elements 10, each having several interior water passages 12 to provide efficient cooling for the immediately adjacent narrow gap discharge regions 14. These low cost, extruded electrodes are mounted on insulating support rings 16 within a hermetic enclosure 18. Cooling water and RF power required for creation and maintenance of the multiplicity of gain channels 14 in FIG. 2 is supplied independently via a plurality of dual water and RF feed tubes 20.

RF DRIVE CONSIDERATIONS

In order to derive the maximum cost-benefit and operational parameters from such a laser geometry it is preferable that each electrode element 10 defining a particular narrow gap gain channel 14 be efficiently and independently driven, but from a common RF power source. This aspects follows from the fact that the extended-area electrodes in these higher power laser devices exhibit a low impedance (typically 10 ohms or less). Thus, in the radial array structure depicted in FIGS. 1&2, having 24 gain channels, the effective parallel load drops to less than one ohm.

However, the output impedance of a typical high power oscillator tube, utilized as the RF energy source, is between 100 and 200 ohms. Consequently there is a 2 order of magnitude impedance mismatch between the RF energy source and the parallel radial array electrode loads.

Consequently, in order to effect efficient RF energy transfer is it necessary to compensate for this enormous impedance mismatch between source and load. Experience has shown that it is exceedingly difficult to satisfy this requirement using conventional impedance matching networks, because each electrode requires its own low-loss matching network. Even if multi-tap RF dividers and impedance matching transforming networks were feasible, such devices would be prohibitively inefficient, expensive, and cumbersome, and therefor impractical to implement commercially.

MULTI-CHANNEL RF POWER TRANSFORMATION

Specifically, because of the large impedance ratios and power levels involved, efficient RF power dividers and impedance transforming networks must have very low internal dissipation and radiative loss. In this context, the performance and efficiency of a tuned LC transforming network can be best quantified in terms of its quality factor Q. The parameter Q is defined as the ratio of energy stored $E_{stor}$ to power dissipated $P_{dis}$. In equation form this becomes:

$$Q = \omega \frac{E_{stor}}{P_{dis}}$$

where ω is the resonant frequency given by:

$$\omega^2 = \frac{1}{LC}$$

Here L and C are the lumped inductance and capacitance of the system. Since RF energy is alternatively stored inductively and capacitively, and power dissipation is proportional to the circuit resistance $R_s$, the circuit quality factor Q becomes:

$$Q = \omega \frac{L}{R_s} = \frac{1}{\omega C R_s}$$

At the excitation frequencies of interest in these narrow-gap discharge devices, the LC elements used in lumped parameter networks are physically small and therefor do not have the low internal dissipation resistance $R_s$ and power handling capacity commensurate with extended area, multichannel arrays. Also, under the enormous reactive currents, resulting from the large impedance mismatch, leakage inductance and radiative losses become excessive. The units also suffer from finite magnetization inductance, skin depth and parasitic capacitive losses, all of which degrade performance. As such, low energy transformation efficiencies are not uncommon under these difficult RF drive conditions.

Fortunately, the deficiencies of conventional lumped parameter matching networks can be negated through adoption of a distributed parameter resonant cavity type impedance transforming and power division concept.

RESONANT RF CAVITY CONSIDERATIONS

As indicated above, the difficulties associated with multi-channel excitation in an array laser may be overcome, at low cost, through the adoption of a resonant cavity approach, to provide both multi-tap power coupling and broad-band impedance transformation with very high power handling capability and exceedingly high efficiency.

Figure 3:
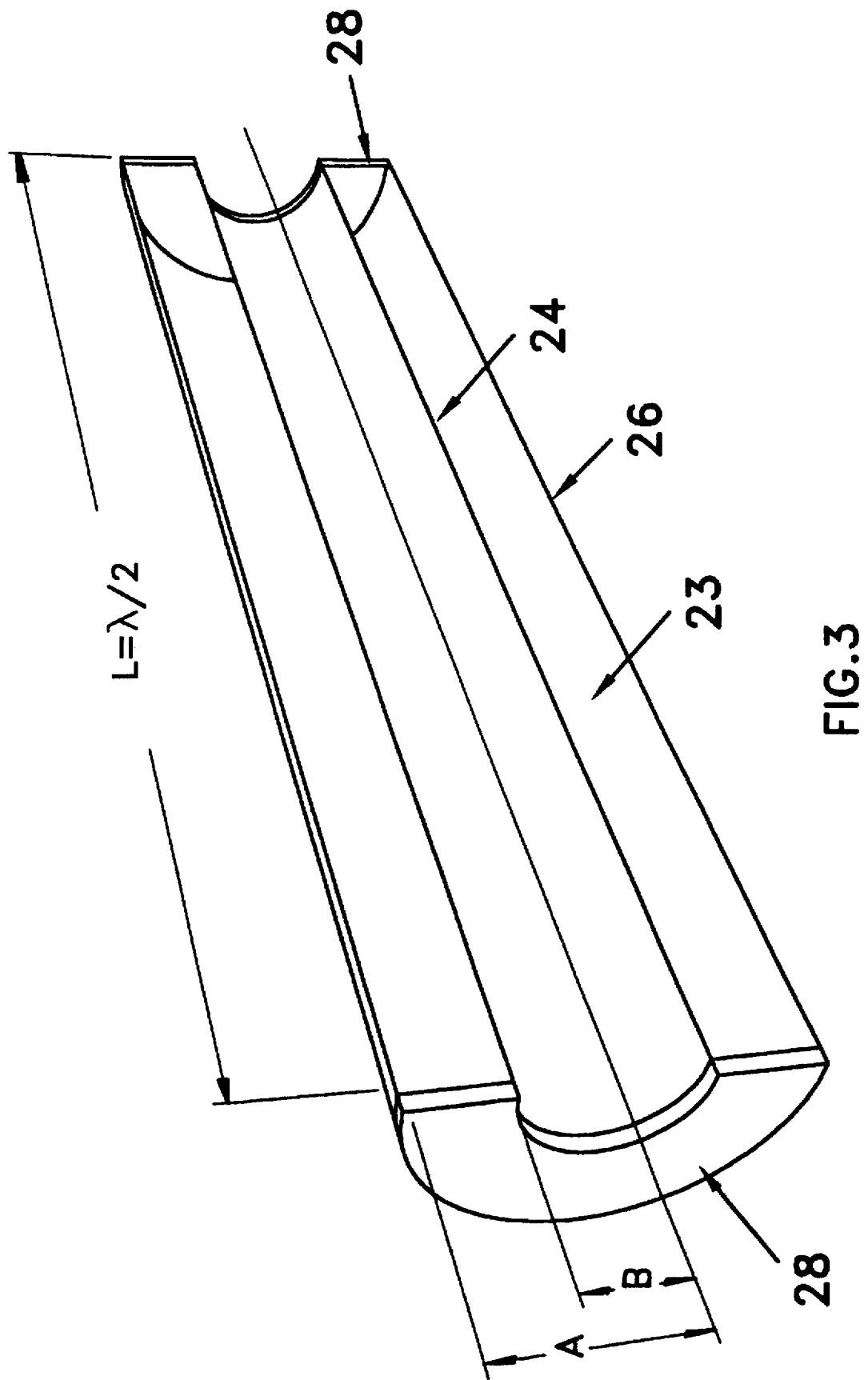
FIG. 3, is a perspective of a half-wavelength co-axial resonant RF cavity.
Figure 4:
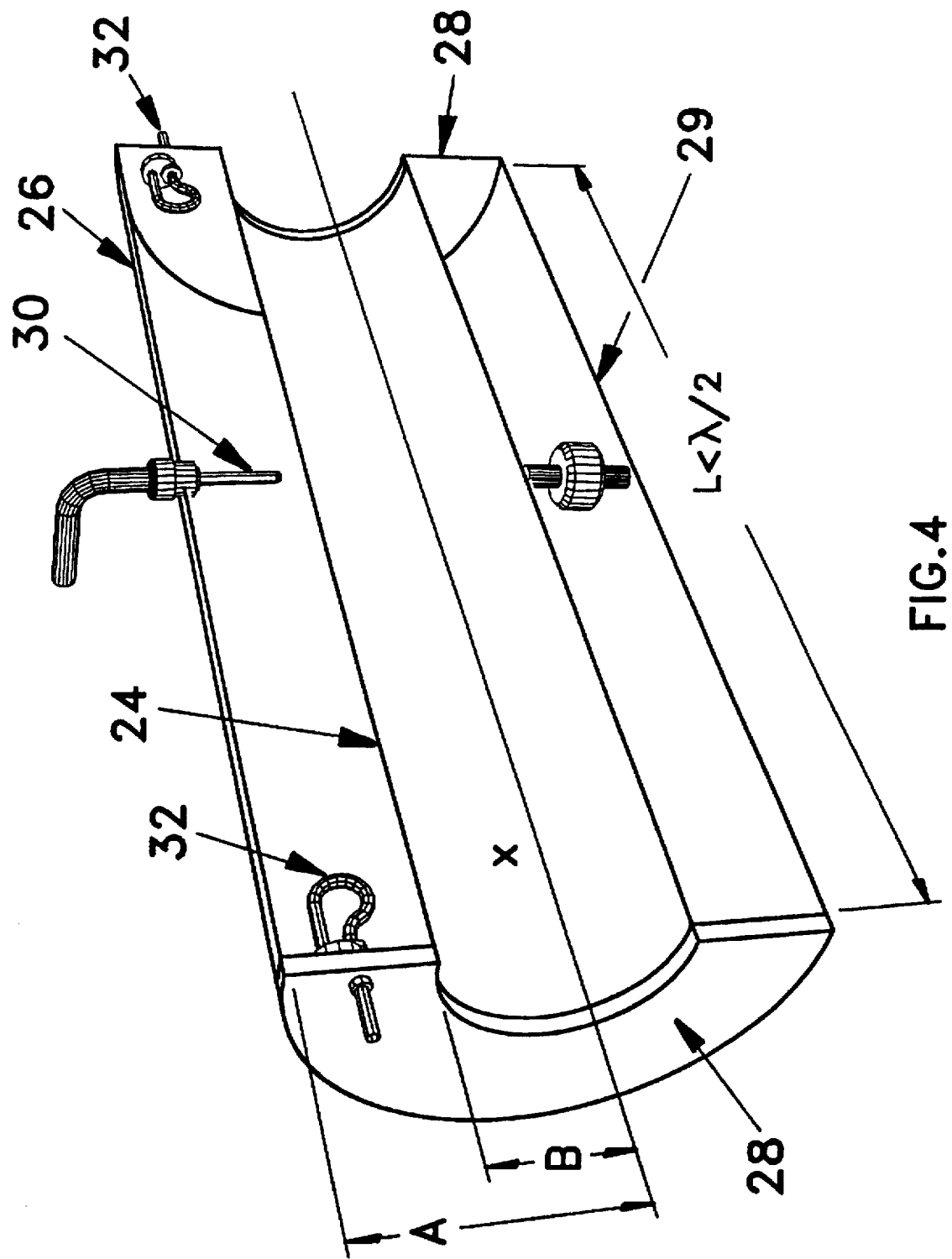
FIG. 4, is a perspective of a capacitively loaded foreshortened, resonant co-axial RF cavity illustrating a high impedance electric probe input at the centerplane and low impedance magnetic loop coupling at the opposing ends.
Figures 5, 5A:
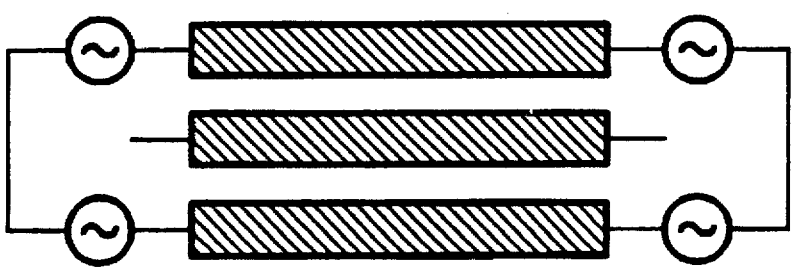

The concept is best illustrated with the aid of the sequence of drawings in FIGS. 3 through 5. As shown in FIG. 3, a co-axial transmission line defining an annular resonant cavity 23 is constructed from inner and outer cylindrical conductors 24 and 26 respectively, supports a TEM$_{00}$ fundamental electro-magnetic mode of propagation, in which only the radial electric field E$_r$ and the azimuthal magnetic field H$_o$ are non zero.

When such a transmission line is terminated with short circuits 28 at either end, a standing electromagnetic wave is created, which becomes resonant at a frequency such that the cavity's overall length l$_{(res)}$ is equal to ½ the wavelength of the impressed electro-magnetic radiation. Under this condition, the distributed series inductance and shunt capacitance of the short circuited, co-axial, cavity structure just balance.

At the preferred operating frequency of narrow-gap diffusion cooled CO$_2$ laser devices (typically around 100 MHZ), l$_{(res)}$ becomes 1.5 m, which is impractically long for a compact laser. However, the length of co-axial cavity necessary for resonance may be shortened to a more convenient length, by means of "lumped capacitive loading", with one or more external RF capacitors 29, as illustrated in FIG. 4.

If the combined value of the lumped capacitors C$_o$ is made much larger than the distributed capacitance of the structure, it dominates the system. Parallel resonance then occurs when this lumped capacitive loading C$_o$ is just balanced by the parallel inductance L$_1$ & L$_2$ of the two short circuited co-axial transmission line sections on either end. If cavity construction is symmetrical then L$_1$=L$_2$, and performance is adequately described by the equivalent circuit and resonance equation of FIG. 5-A.

Under these conditions, the length l$_{(res)}$ of a foreshortened, co-axial, loss-less, cavity at resonance becomes considerably shorter than a half wavelength, and is given by:

$$l_{(res)} = \text{arc tan}\,(1/[\omega Z_o C_o])/\beta$$

where, C$_o$= is the total value of the lumped capacitances 29, while β=2 π/λ is the phase constant, λ is the wavelength and ω is again the resonant frequency. The term Z$_o$=[μ/ε] ln(B/A) is the characteristic impedance of the shorted transmission lines, while A & B are respectively the inner and outer diameters of the co-axial structure depicted in FIG. 4. The parameters μ and ε are the magnetic permeability and electric permittivity of the media contained within the cavity. These two parameters are usually specified by the term Z$_i$=[μ/ε]$^{1/2}$, generally known as the "intrinsic impedance" of the electromagnetic wave propagating media.

If cavity construction is non-symmetrical, such that only one short circuited co-axial transmission line section is used, the circuit and resonance conditions become as illustrated in FIG. 5-B. Alternatively, if the cavity has a "T shape" geometry, as in the experimental system illustrated in FIGS. 10&11, the appropriate equivalent circuit becomes as shown in FIG. 5-C. Because the parallel inductance of both straight arms is now in series with the side arm L$_3$, the effective inductance is:

$$L_{effective} = L_1/2 + L_3$$

The design of the cavity is equally applicable to single slabs, but has fewer advantages as compared with the use of the cavity on arrays since the difficulties of matching the RF source to a single slab are not as great.

RESONANT CAVITY IMPEDANCE TRANSFORMATION

Solution of the EM wave equations for the type of resonant co-axial cavity structure described above reveals that the radial electric and azimuthal magnetic fields become functions of position (x) along the cavity axis, measured from the plane of the short circuit as in FIG. 3. If both wall and dielectric losses within the cavity are negligible, these fields have dependencies given as:

$$E_{r(x)} = E_o/r \cdot \sin\,(\beta x) \quad H_{o(x)} = -j\,E_o/r \cdot [\epsilon/\mu]^{1/2} \cdot \cos\,(\beta x) = -j\,E_o/r \cdot 1/Z_i \cdot \cos\,(\beta x)$$

E$_o$ is the peak value of the electric field in the gap while r is the radial distance from the cavity centerline.

It is clear from the above equations that the radial electric field is maximum at the mid-plane of symmetry, (i.e. where x=l$_{(res)}$/2=λ/4), and decreases to zero at the short circuited ends. Conversely the azimuthal magnetic field is maximum at the ends and becomes negligible in the central region. The local impedance Z$_{res(x)}$, herein defined as the ratio of the electric to magnetic field seen at a specific axial position (x) along the structure, becomes at resonance:

$$Z_{res(x)} = E_{r(x)}/H_{o(x)} = Z_i \cdot \tan\,(\beta x)$$

Examination of the above equation reveals that the mid-section is a region of extremely high impedance, (infinite in the case of zero loss), while both end sections are regions of very low impedance. Special use can be made of this inherent impedance transforming feature of a resonant cavity by feeding electromagnetic energy into the cavity from an external, high impedance vacuum tube RF power source, via an electric probe 30 situated at the mid-plane. Independent, multi-channel low impedance output power division and coupling can be achieved through multiple magnetic loops 32, disposed in and about the cavity end faces, as in FIG. 4.

Although as revealed above, the theoretical impedance transformation ratio obtainable with a loss-less resonant cavity can be infinite, in "real" situations this is not the case; since both the cavity losses and external load alter the situation markedly. Consequently, the actual impedance transformation ratio, from the effective external load Z$_{ext}$, loop-coupled into the end walls, to the maximum resonant impedance Z$_{res}$ seen at the mid plane of an unloaded cavity becomes:

$$Z_{res}/Z_{ext} = Q_u/Q_L$$

Here Q$_L$ and Q$_u$ are respectively the "loaded and unloaded" Q's of the resonant cavity. These 2 important parameters are more fully discussed in a following section.

Since low cost cavities having a ratio Q$_u$/Q$_L$ of several hundred are easily constructed in practice, this resonant-cavity-impedance-transformer concept becomes an eminently viable approach for matching a typical high impedance high power RF vacuum tube to the very low impedance loads presented by multiple wide slab discharge channels.

MULTI-CHANNEL POWER DIVISION AND IMPEDANCE MATCHING

Figure 6:
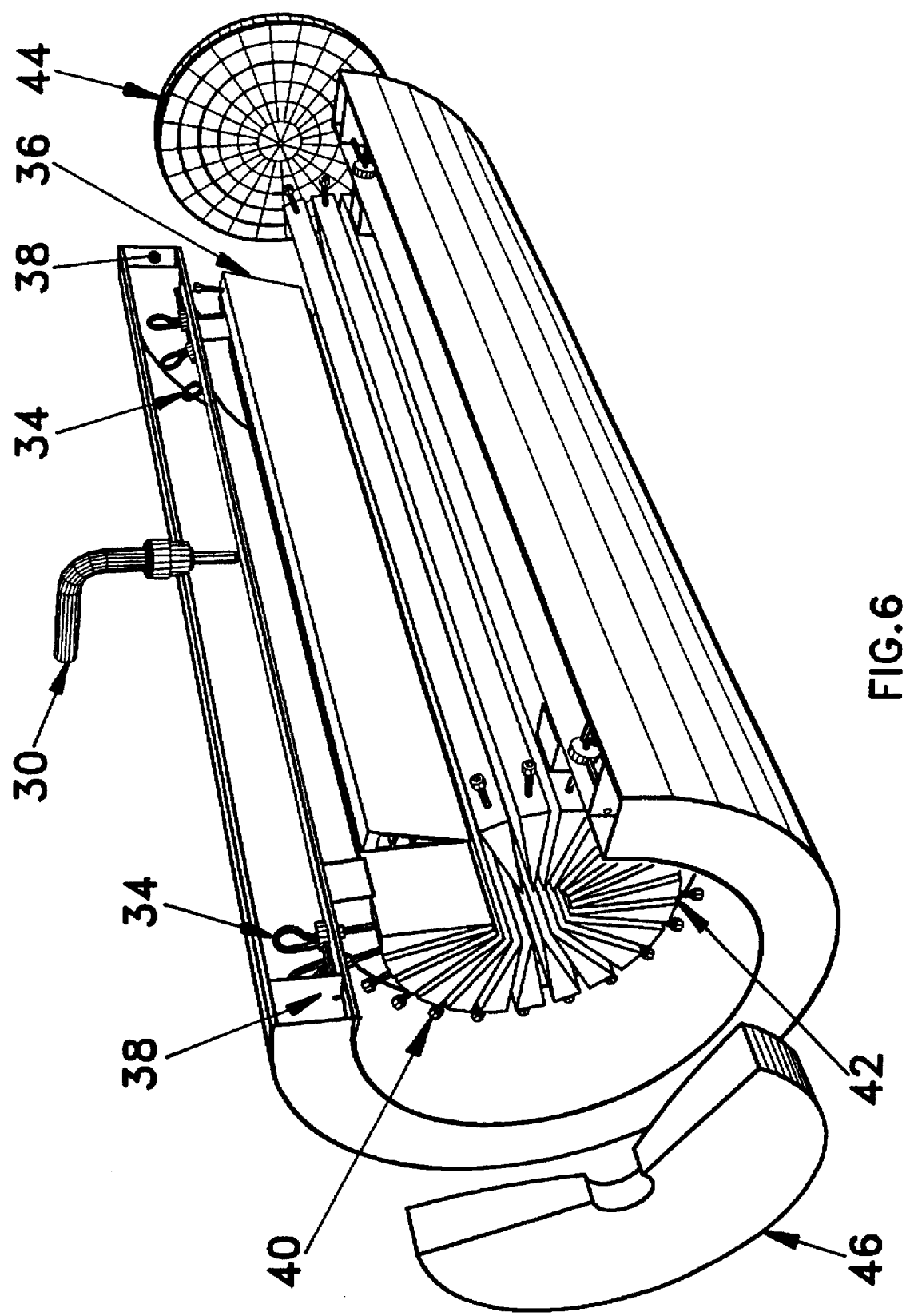
FIG. 6, is a perspective, partially cut away for a multi-channel magnetic loop coupled impedance transforming resonant cavity RF power divider for excitation of a multi-channel electrode structure sharing a common optical extraction system.

The basic multi-channel impedance matching and power division aspects offered by the resonant cavity system illustrated in FIG. 4. is exploited to provide a compact, low cost, and highly efficient method for RF excitation of a multi-channel radial array laser structure as depicted in FIG. 6. As can be seen, this matching and power division co-axial structure has been built integrally into the outer wall of a hermetic laser enclosure.

Integrated and simultaneously water cooling for the individual magnetic coupling loops 34 and their corresponding hollow RF electrodes 36 is achieve via inlet and outlet water manifolds 38. Independent RF power division and coupling into each electrode segment is achieved by extension tubes 40 extending from the magnetic loops 34. The faces of the electrodes define the edge of the slab gain channels and confine excitation material to the gain channel.

Because alternate electrode elements are fed from loops positioned at opposite ends of the cavity, mirror image mounting symmetry provides the 180 degree phase change required between alternate RF driven electrodes. External RF power drive for the multi-channel discharge system is again accomplished via the electric probe 30. Laser energy is simultaneously extracted from each of the independently driven narrow-gap gain channels via common optical resonator comprised of mirrors 44 and 46.

Figure 10:
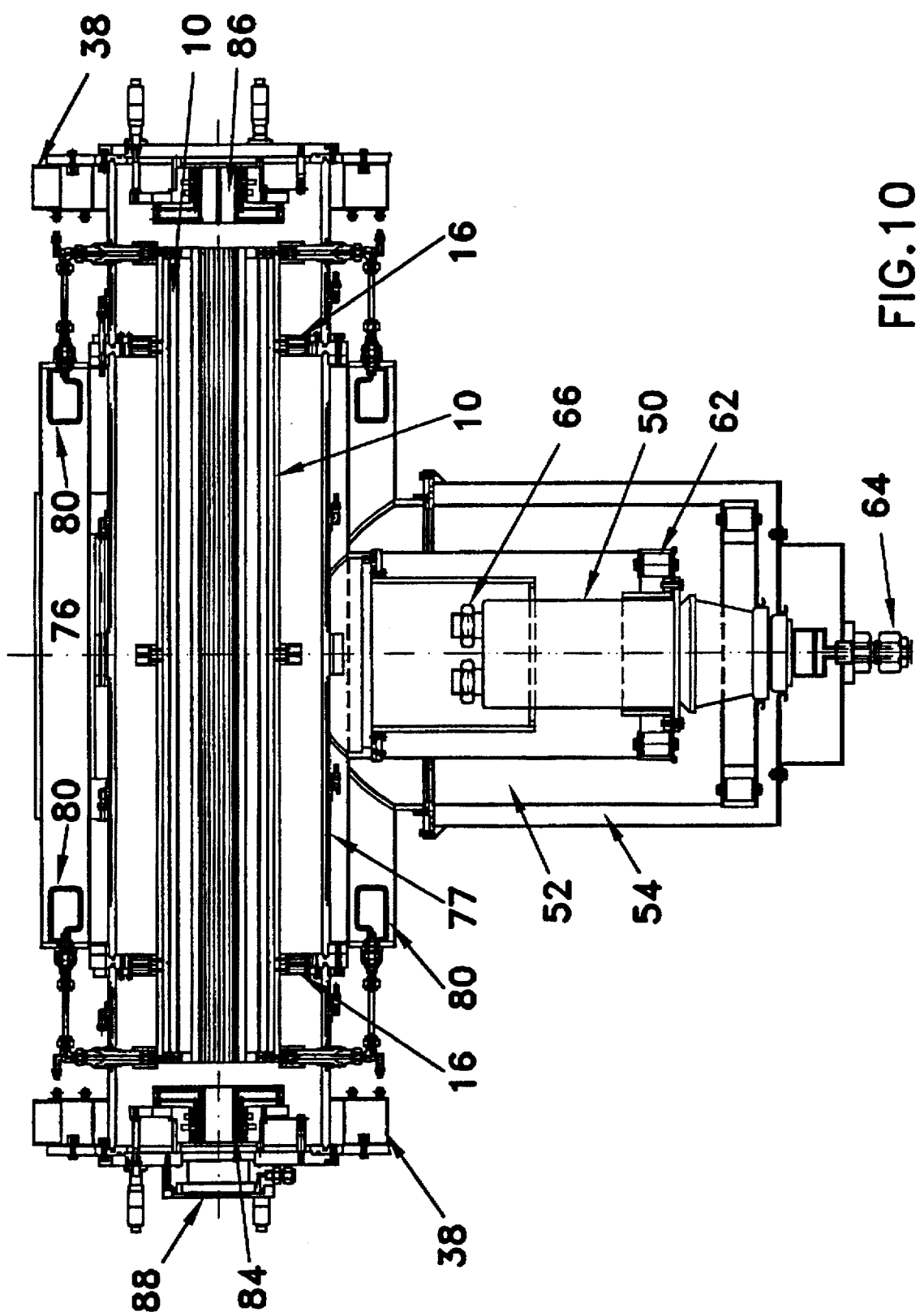
FIG. 10, is a construction schematic diagram of a 24 slot, 10 kW radial array laser developed for experimental studies, featuring an integrated self-excited RF source with resonant RF cavity multi-channel RF power division and impedance matching system.

If the RF cavity structure is fabricated independently and electrically isolated from the laser's vacuum enclosure, as illustrated in the actual construction schematic of FIG. 10, then the electrodes become "floating" such that superior discharge isolation is derived between the multiple electrodes and the laser's metallic enclosure. This aspect minimizes corona-to-ground problems normally encountered in slab laser systems at higher pressures and RF excitation power levels.

STANDING WAVE & TRAVELLING WAVE COUPLING

Impedance matching and power division to each of the electrodes is accomplished by rotating the individual loops 34 to achieve the proper degree of magnetic-loop-coupling to the circulating magnetic field within the resonant cavity. In that a waterfeed line is installed into each end of each electrode segment, it is possible to have double-ended RF energy drive if desired. This type of RF coupling, generally known as "Standing wave coupling", usually requires that several small lumped inductors be mounted at strategic locations along and between alternate electrode elements, to minimize standing wave voltage variations along the extended electrode lengths.

An alternative method of RF coupling, herein termed "Travelling wave coupling" may be achieved by supplying RF power at opposite ends of alternate electrodes. In this manner, a "travelling-wave strip-transmission-line" type of excitation is achieved. RF energy is thus continually pumped back and forth from one end of the resonant cavity to the other, via the capacitively coupled multiple strip-transmission-lines formed by the parallel electrodes. This aspect provides for efficient and uniform RF energy deposition within each gain channel, without need for the installation of periodic tuning inductions along the electrodes inside the laser body. As such, the approach is not only simpler to implement but also is broader band.

If the length of the discharge electrodes within the laser is very much shorter, or alternatively very much longer, than the wavelength of the RF power source, then full-amplitude, dual-polarity, traveling-wave, uniform excitation, with an advantageous voltage doubling effect, is achieved across the full length of each inter-electrode gap.

A somewhat different situation is encountered however, when the electrode lengths and RF wavelength are of the same magnitude. This follows since the nature of the cavity loop coupling technique utilized herein imposes only "in-phase" or "180 degrees-out-of-phase" RF feeds. Thus, phase changes accumulated along the length of the electrodes can reduce the effectiveness of the opposing-polarity travelling-wave excitation.

Notwithstanding this fact however, excellent performance can still be achieved if the electrode lengths are selected to be a half-wavelength of the RF excitation frequency. Under this condition, it now becomes feasible to drive both ends of each electrode. The several circuit schematics of FIG. 5A illustrate typical RF drive combinations that may be used. Indeed, if the electrodes are approximately a half-wavelength, the highly desirable voltage doubling effect seen previously may be retained, provided the two adjacent electrodes are similarly driven but with polarities opposite to that of each nearest neighbor as depicted in FIGS. 5A-1 to 3.

Although the drive configuration of FIG. 5A-4 does not give voltage doubling, it does however provide highly desirable electrical isolation between the individual discharge slots. Under these conditions one loop acts as a nondissipative impedance matching and power termination for the strip transmission line formed by the parallel electrodes, and thereby feeds unabsorbed RF energy back into the resonant cavity for subsequent reuse. For optimum performance the ground side of the coupling loops should be "floated" from the case ground. This aspect eliminates corona to the metallic vacuum enclosure.

Adequate performance can also be obtained under conditions where the electrodes are a quarter-wavelength long. However, the voltage doubling effect previously provided by dual polarity RF drive is not obtained. Instead each electrode is only driven from one end and the other end is RF grounded. The two nearest neighbor electrodes are however still driven by an opposite polarity RF feed.

The magnetic loop RF drive connection shown in FIG. 5A-5 has every intermediate electrode non driven directly, but rather only as a series element. This aspect reduces the required number of magnetic loops by one-half.

In summary therefore, the operational sequence associated with FIG. 6, is that RF energy is supplied to the laser head from an external RF power source via the input electric power probe 30. Cooling from the water headers 38 and RF power are simultaneously provided to each electrode segment 36, via the magnetic loops 34 and water feed tubes 40. The position of the magnetic loops 34 are set to provide alternate positive and negative RF potentials at each sequential electrode element 36. The actual amount of RF energy coupled to each electrode loop is easily controlled by rotational adjustment of each magnetic loop.

A multiplicity of gas discharge gain regions or slots is therefor created between the faces of adjacent electrodes 36 within a lasing gas mixture, for either $CO_2$, CO, Excimer, or other types of lasers. A population inversion is concomitantly generated within the individual discharge slots due to RF excitation, thereby creating a multi-channel radial gain array. Laser energy is extracted from the structure via a common optical resonator comprised of primary mirror 44 and output mirror 46. The additional mechanical aspects of the system to insure hermiticity and output beam extraction from the laser chamber are not shown.

RF CAVITY CONSIDERATIONS—THE UNLOADED CAVITY Q

Since the basic definitions of Q expressed earlier for matching networks also apply to resonant cavities, one may define:

$Q_u = \omega \cdot [E_{stor}/P_{dis-c}]$ [unloaded $Q$]

$Q_L = \omega \cdot [E_{stor}/P_{dis-tot}]$ [loaded $Q$]

$Q_{ext} = \omega \cdot [E_{stor}/P_{dis-ext}]$ [external $Q$]

where $\omega$ and $E_{stor}$ are again the resonant frequency and Energy stored in the cavity. $P_{dis-c}$ and $P_{dis-ext}$ are respectively power dissipated in the cavity resistance $R_c$ and the external circuitry $R_{ext}$, while $P_{dis-tot}$ is the total power dissipated in the system. If the input and output circuits are matched then:

$R_{ext}=R_G+R_L$ where $R_G$ and $R_L$ are the generator and load resistances.

From microwave theory considerations it may also be shown that:

$$1/Q_u=1/Q_{wall}+1/Q_{diel}$$

$Q_{wall}$ and $Q_{diel}$ are the ratios of the energy stored to the resistive loss $R_c$ or dissipation factors DF within the walls and dielectric. Thus $Q_u$ of a cavity is determined by the losses in the cavity walls and the dielectric material contained inside it. If the cavity interior is plated with high conductivity silver, $R_c$ drops below a milliohm and so $Q_{wall}$ values of 10,000 are readily achieved. Fabrication with copper still gives this parameter values above 2000.

If the dielectric inside the cavity is air, $Q_{diel}$ is also extremely high, since the dissipation factor $DF=1/Q_{diel}$ for air is essentially zero. However,in greatly foreshortened cavities, the lumped loading capacitors used are usually made from a somewhat lossier dielectric material. Notwithstanding this fact, ultra-low-loss RF capacitors fabricated from $TiO_2$, $Al_2O_3$ or Teflon, with $Q_{diel}$ values of 10,000 are available. Even small, low cost RF capacitors made from Strontium Barium Titinate with a DF of 0.1% are now available. Thus, a $Q_{diel}$ of over 1000 is readily achievable.

THE LOADED CAVITY Q

On the other hand, the loaded $Q_L$ is primarily determined by the external $Q_{ext}$, which is in turn inversely proportional to the total external load $R_{ext}$ coupled into the cavity. In the radial array laser case under consideration here, the external load is constituted by both the generator resistance $R_G$ and combined parallel resistance of the multiple gain channels $R_L$. Under typical discharge conditions $R_L$ can be 1 ohm or less, while the generator impedance may be 50 ohms. Thus, $Q_{ext}$ is approximately equal to $Q_L$ and will assume a very low value.

CAVITY ENERGY TRANSFORMATION EFFICIENCY

The resonant cavity approach to provide multi-channel power division and impedance matching is useful for an array of narrow-gap gas discharges, as in FIG. 6, but is particularly useful for radial array laser excitation. RF energy deposited into the cavity can only eventually be dissipated within the cavity itself or in the external circuitry. Since external circuit dissipation is constituted by both the generator resistance $R_G$ and the load external $R_L$, one may write:

$$P_{dis-tot}=P_{dis-c}+P_{dis-G}+P_{dis-L}$$

Using the expressions for quality factor seen previously it may be shown that:

$$1/Q_L=1/Q_u+1/Q_{ext}=1/Q_u+1/Q_{RG}+1/Q_{RL}$$

where $Q_u$, $Q_L$, $Q_{RG}$ and $Q_{RL}$ are as defined earlier.

The energy transformation efficiency $n_c$ of a resonant cavity is herein defined as the ratio of the useful energy dissipated in the external load $E_{dis-L}$ to the total energy dissipated in the system $E_{dis-tot}$. Under typical, heavy output circuit coupling, where energy dissipation in the load $R_L$ is much greater than in the generator, the efficiency equation becomes:

$$n_c=P_{dis-L}/P_{dis-tot}=[P_{dis-tot}-P_{dis-c}]/P_{dis-tot}$$

From an examination of the definition of loaded and unloaded Q's of a cavity presented earlier is it clear that:

$$P_{dis-tot}=E_{stor}/Q_L$$

while $$P_{dis-c}=E_{stor}/Q_u$$

Upon inserting these expressions into the above equation for cavity efficiency one obtains the following simple relationship.

$$n_c=1-Q_L/Q_u$$

It is clear from this equation that if $Q_u$ and $Q_L$ can be designed to have values differing by a factor of 100, than an energy transformation efficiency approaching 100% may be achievable. As an example, consider the case of low-loss capacitive loading. Under this condition the cavity wall losses $R_c$ will dominant the unloaded $Q_u$, and so $Q_u=\omega L/R_c$. This ratio can then be approximated as:

$$Q_L/Q_u=R_c/R_L.$$

For a cavity constructed from copper $R_c$ will be a few milliohms (typically 5 milliohms), while the combined external load $R_L$ presented by the multiplicity of electrodes will be about half an ohm. Using these typical values, the term $Q_L/Q_u$ assumes a value of about 0.01 in a well constructed resonant cavity. This means that the RF energy transformation $n_c$, can reach 99%.

Clearly, only a few percent of the RF energy need be lost in the power division and impedance matching process. This is an excellent situation, and is in sharp contrast to the case of conventional lumped matching networks, which under large mismatch and high average power conditions dissipate so much energy that provision must be made for water cooling of the individual LC elements.

RF GENERATOR CONSIDERATIONS

At the high RF average power levels required for excitation of the extended area multi-channel high power laser arrays, it is not cost effective to employ conventional RF oscillator-amplifiers as energy sources. It is preferred to use self-excited "Class C" RF generators to achieve the efficiencies required, provided that losses within the generator itself can be minimized.

LUMPED RF TANK CIRCUITS

Class C operation of an RF generator generally implies that a parallel LC circuit, commonly known as a Tank Circuit, is used as a high impedance element at resonance, together with a shunting "negative conductance" electronic tube, to generate the RF oscillation energy. High efficiency in RF energy production therefor requires that the Tank Circuit have very low internal dissipation and radiative loss.

As in the case of RF energy transformation examined earlier, conventional lumped LC resonant tank circuits do not have a sufficiently high Q to provide the efficiencies desired for high power RF energy generation. These deficiencies can again be negated through adoption of the same microwave techniques outlined earlier, in the form of a distributed "Cavity" type resonant tank circuit concept.

DISTRIBUTED RF TANK CIRCUITS

Figure 7:
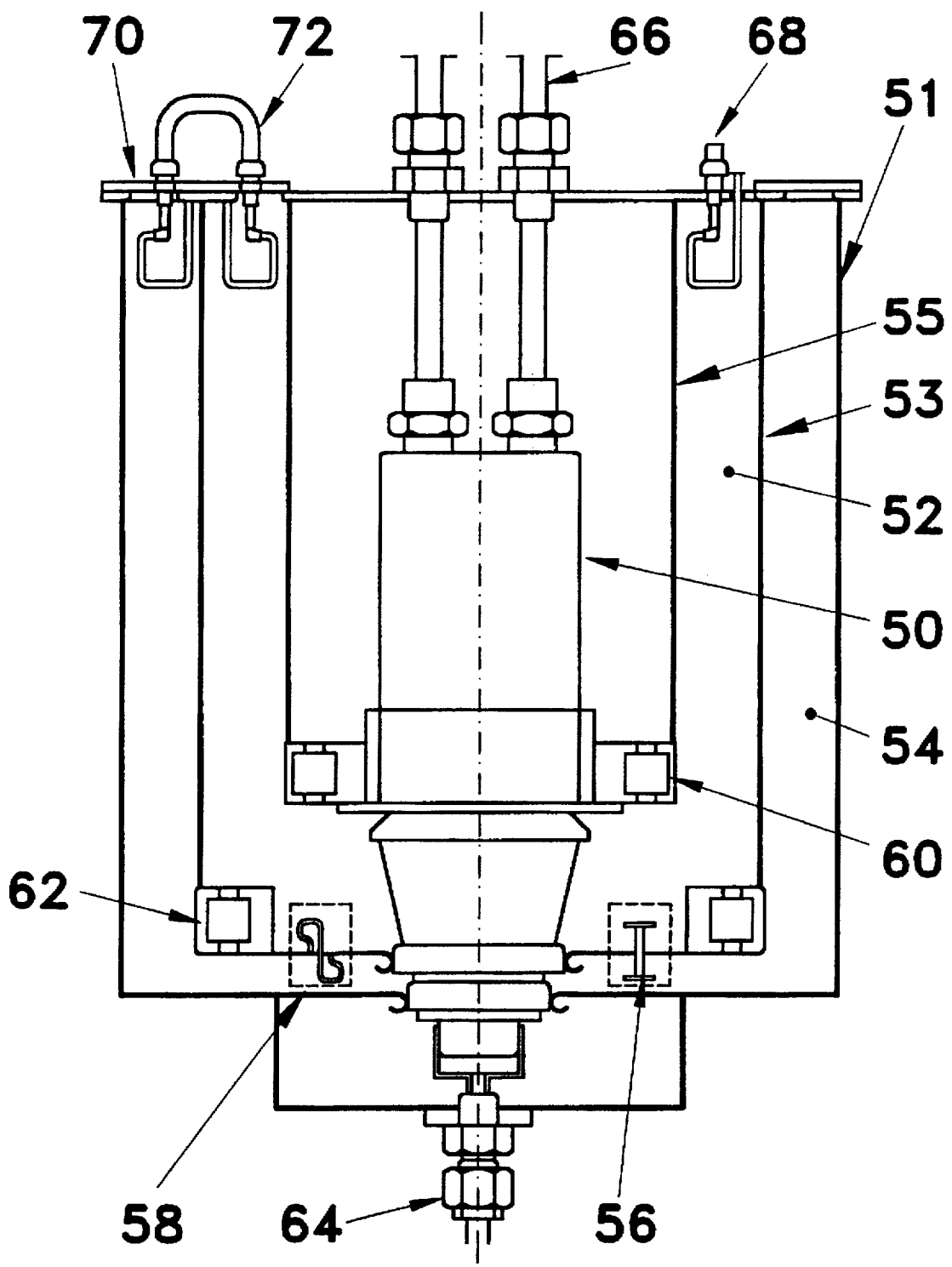
FIG. 7, is a schematic of a high power self-excited RF power oscillator comprised of a high power ceramic vacuum tube and featuring concentric ¼ wavelength co-axial resonant cavities serving as anode and grid RF oscillator tank circuits, tuned to a common frequency and having positive feedback coupling for self-excited operation.

The resonant cavity RF tank circuit concept described above is well illustrated in the schematic diagram of FIG. 7. The drawing represents a "SELF-EXCITED CAVITY-COUPLED RF SOURCE" capable of generating several hundred kilowatts of output power over a wide frequency range. The active electronic device 50 is a high power "lighthouse" type ceramic triode or tetrode inserted into two coupled resonant tank circuits 52 and 54 confined between concentric conducting cylinders 51, 53 and 55.

¼ WAVE CAVITIES

Both the anode-to-grid tank circuit 52 and the grid-to-cathode tank circuit 54 are formed by ¼ wavelength, capacitively foreshortened, co-axial, short-circuited transmission line cavities. Low loss capacitive loading is now supplied by the inter-electrode capacitances of the electronic tube itself.

Positive feedback coupling between these 2 tank circuits, achieved by either probe 56 or loop 58, provides self-excited operation. Alternatively, positive feedback may be derived via the interconnected loops 70 and 72. Anode and grid bypass capacitors are installed at points 60 & 62. Heater filament current is supplied via the water cooled cable 64, while anode DC power and cooling are supplied via isolated tubes 66.

RF energy is coupled out of the anode tank circuit via a multiplicity of magnetic loops 68 uniformly distributed around the periphery. All tank circuit components may be constructed from a low loss material, such as copper or silver plated brass. The large surface areas and high unloaded Q inherent in this dual resonant cavity RF tank circuit design provides a very high power capability with good efficiency and excellent RF shielding.

RF ENERGY COUPLING

Figure 8A:
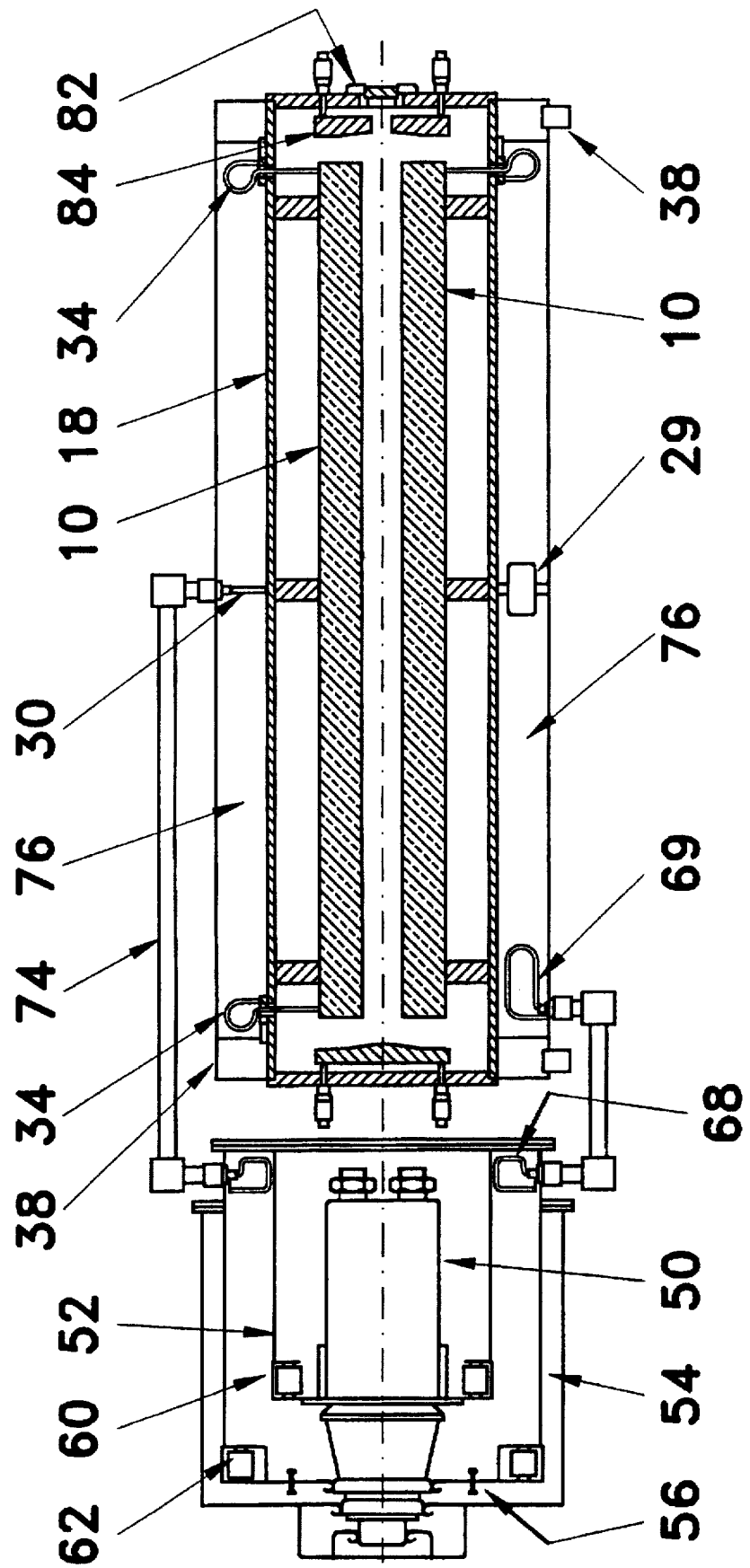
FIG. 8A is a schematic of a multi-channel magnetic loop coupled radial array laser system driven by an external self-excited resonant cavity tank circuit RF power oscillator.
Figure 8B:
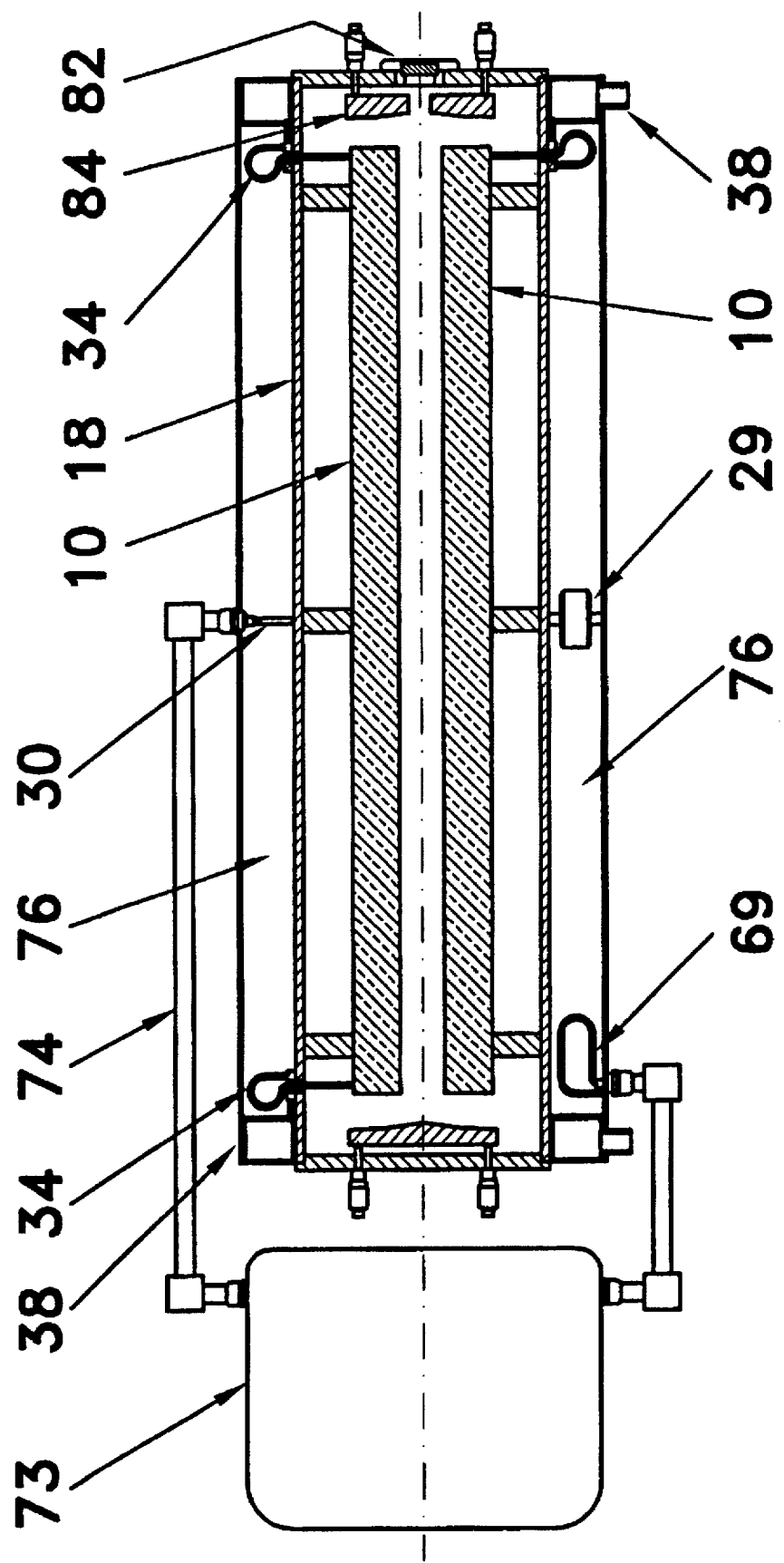
FIG. 8B, is a schematic of a multi-channel array system driven by a magnetron.

FIG. 8 illustrates a convenient and compact method by which RF energy derived from the ceramic vacuum tube 50 within the self-excited resonant cavity RF source of FIG. 7 may be coupled into a multi-channel laser system of FIG. 6. In order to accommodate the very high RF power levels involved, several magnetic-loop-coupled feeder co-axial cables 74 are employed. In this configuration, energy is transferred via a multiplicity of output magnetic loops 68 and input electric probes 30 distributed uniformly around the periphery of the device. Alternatively, the source of laser excitation energy could be a magnetron 73 shown in FIG. 8B coupled via multiple co-axial feeder lines 74 to the co-axial resonant cavity.

Alternatively an all-magnetic-loop coupled power transfer approach may be achieved with several cables 75 feeding loops 69. Water cooling and RF drive to the multiple extruded electrodes 10 is again derived via water headers 38 and magnetic loops 34. Optical energy is extracted from the adjustable resonator system 86 & 84, through the output ZnSe window 88.

A further simplification and reduction in cost may be realized by substituting an R.F. Magnetron source 73 in place of the vacuum tube source as shown in FIG. 8B.

Figure 9:
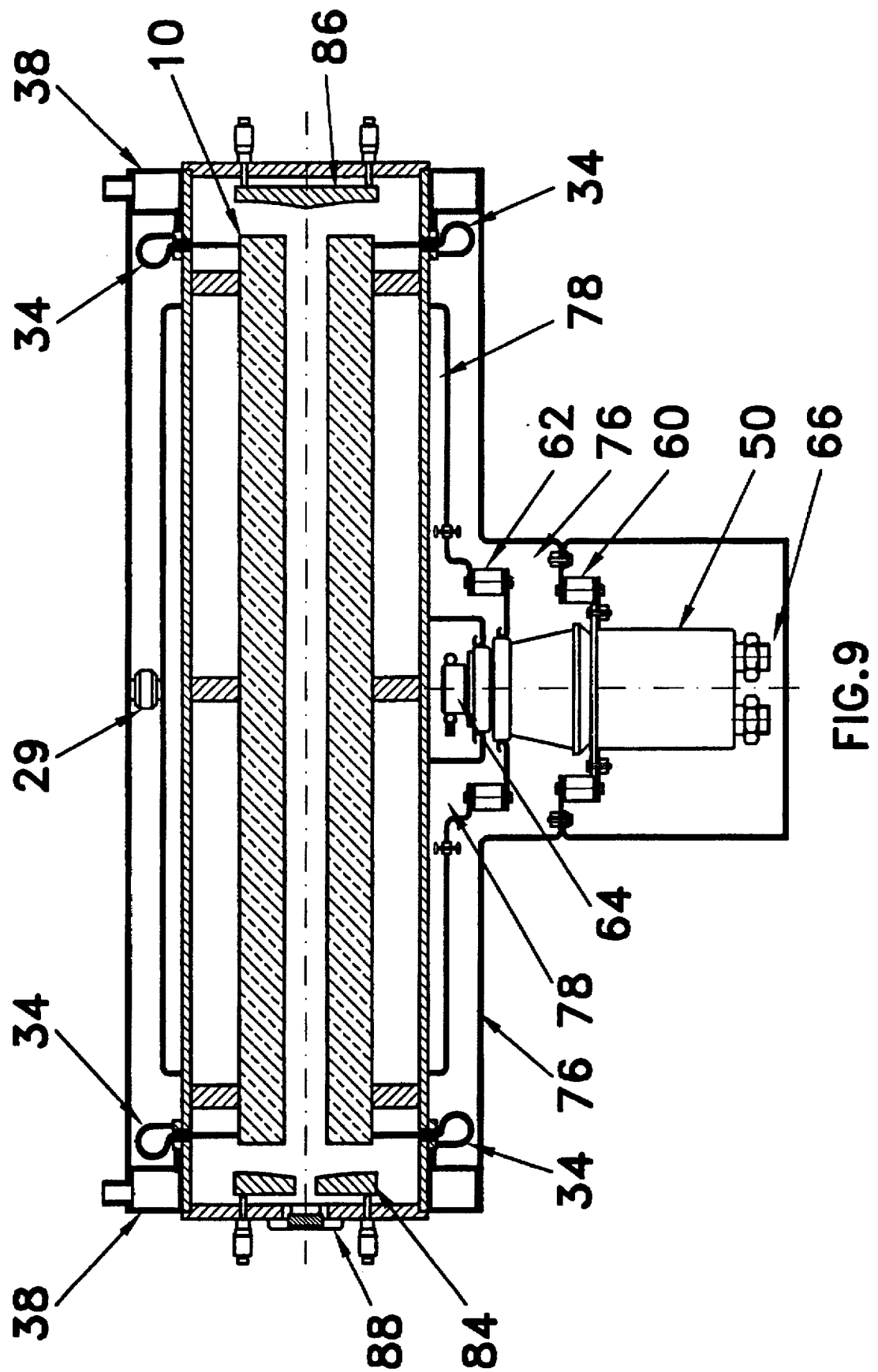
FIG. 9, is a schematic of a multi-channel magnetic loop coupled radial array laser system driven by a fully integrated self-excited resonant cavity RF power oscillator, featuring a high power vacuum tube built into a double co-axial RF resonant cavity having positive feedback coupling.

A more fully integrated RF power transfer configuration is shown in FIG. 9, in which the electronic tube 50 for the self-excited RF cavity oscillator has been built directly into the resonant cavity power division and impedance matching system for the laser head. This construction eliminates the need for all cables and further enhances compactness.

In this approach, the anode-to-grid tank circuit now becomes part of the co-axial RF power division and impedance matching system, in the form of a single "T shaped resonant cavity" 76, thereby illuminating one resonant system and further simplifying construction. The grid-to-cathode tank circuit is formed by a similar co-axial resonant cavity 78, conveniently wrapped around the laser's hermetic chamber itself. Depending on the desired frequency of operation, and if the anode-to-grid inter-electrode capacitance of the electronic tube 50 is sufficiently large, the lumped loading capacitor 29 may not be required.

MULTI-CHANNEL MAGNETIC LOOP COUPLING

Independent RF energy drive to each electrode segment is again achieved via a multiplicity of coupling magnetic loops 34 disposed around the periphery. Because of the electromagnetic boundary conditions imposed by the side arm of the T structure, the azimuthal magnetic fields in the straight sections are reversed. Thus, opposite magnetic loops must be rotated through 180 degrees to obtain the desired negative electrode polarity.

Water cooling for both the coupling loops and the electrodes is derived by fabricating the loops from hollow copper tubing and connecting the ground end of the loop into the input and output water cooling headers 38, located at either end of the structure. Laser radiation is extracted from the device by means of the optical resonator formed by water cooled output and primary mirrors 84 & 86 and a ZnSe output window 88.

FIG. 10 is a sectioned assembly drawing of a fully integrated 10 kW, 24 channel radial array laser constructed for experimental purposes. The magnetic coupling loops 80 for driving each electrode were modified from that illustrated in FIG. 9 to permit easier data collection for research purposes. In this configuration, cooling water for each electrode is derived from the headers 38 via a multiplicity of short insulated tubes.

Figure 11:
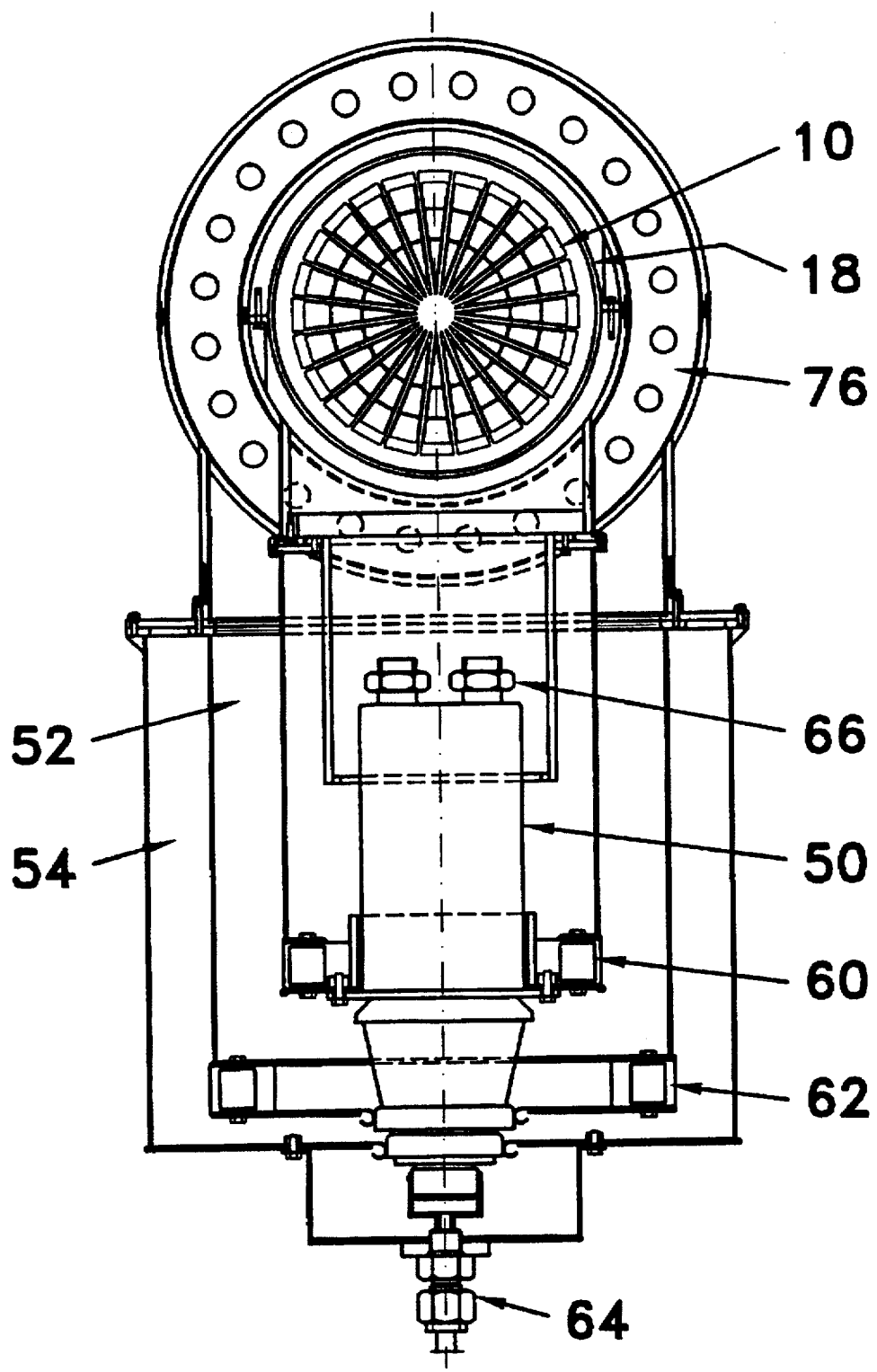
FIG. 11, is a cross-sectional schematic drawing of a 24 slot, 20 kW radial array laser featuring wider electrodes driven by an integrated self-excited RF power source and a resonator RF cavity multi-channel RF power division and impedance matching system.

The grid-to-cathode tank circuit construction 54 is again as given in FIG. 7, being wrapped around the vacuum tube 50, rather than around the laser chamber as in FIG. 9. FIG. 11 is a cross-sectional diagram of an experimental 24 slot, laser system similar to that of FIG. 10, but modified with wider electrode segments to give a CW optical output power of 20 kW.

ALTERNATIVE RF ELECTRONIC TUBE & COUPLING SYSTEMS MULTIPLE VACUUM TUBE SOURCE

Figure 12:
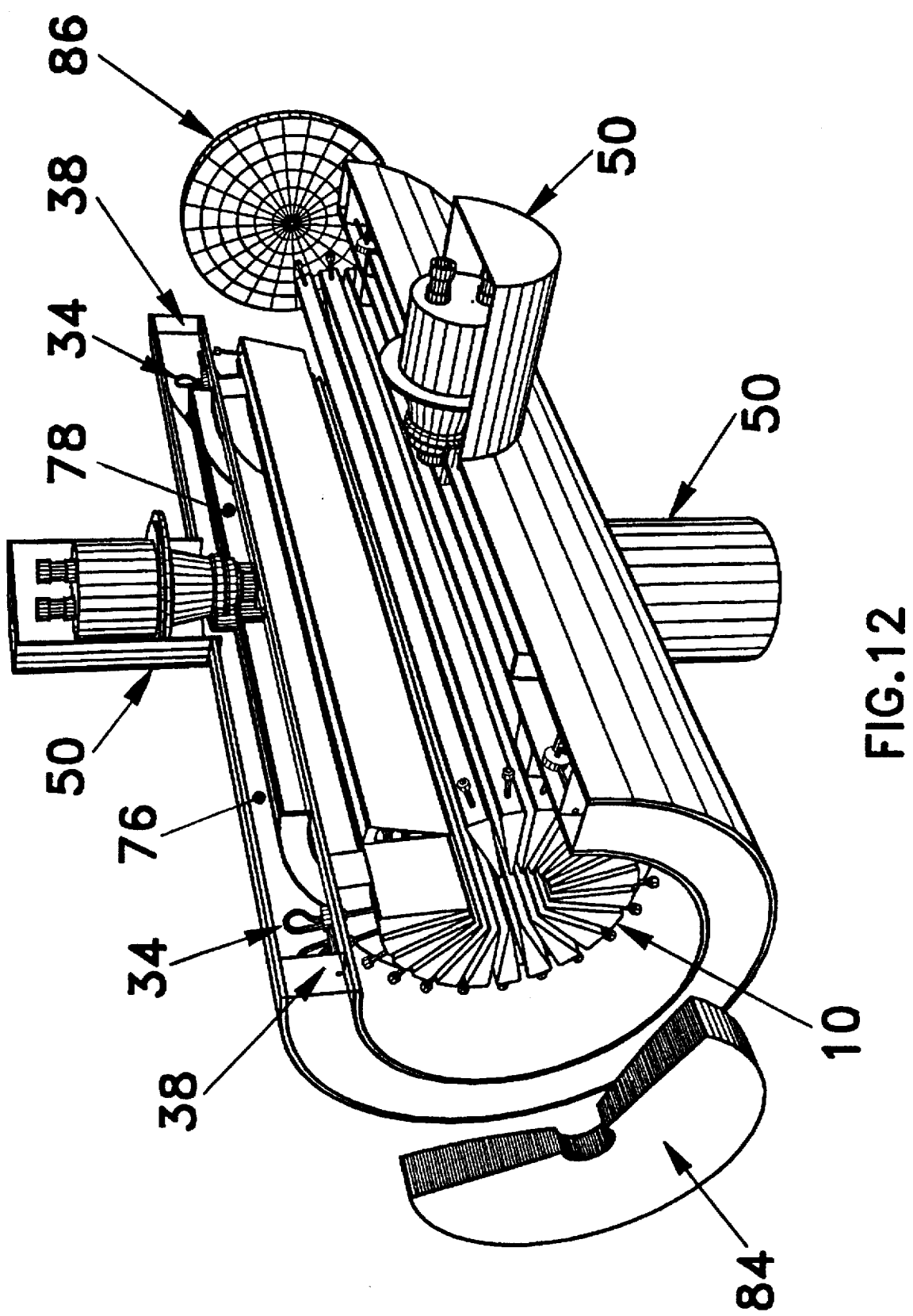
FIG. 12, is a perspective partially cut away of a high power radial array laser having an integrated RF drive system featuring 4 RF vacuum tubes mounted in a radial manner and operated in parallel to supply RF energy to the common resonant cavity power division and impedance matching system.

Although the integrated RF generator configurations of FIGS. 9 through 11 utilize a single RF tube, a more compact structure may be realized by incorporating several smaller electronic tubes into the structure, as shown in FIG. 12. The approach illustrated with 4 tubes 50, each independently coupled into the resonant cavity system, has the additional feature that failure of a single tube does not terminate laser operation, since the other tubes remaining in parallel can still supply RF excitation energy to the system.

Figure 13A:
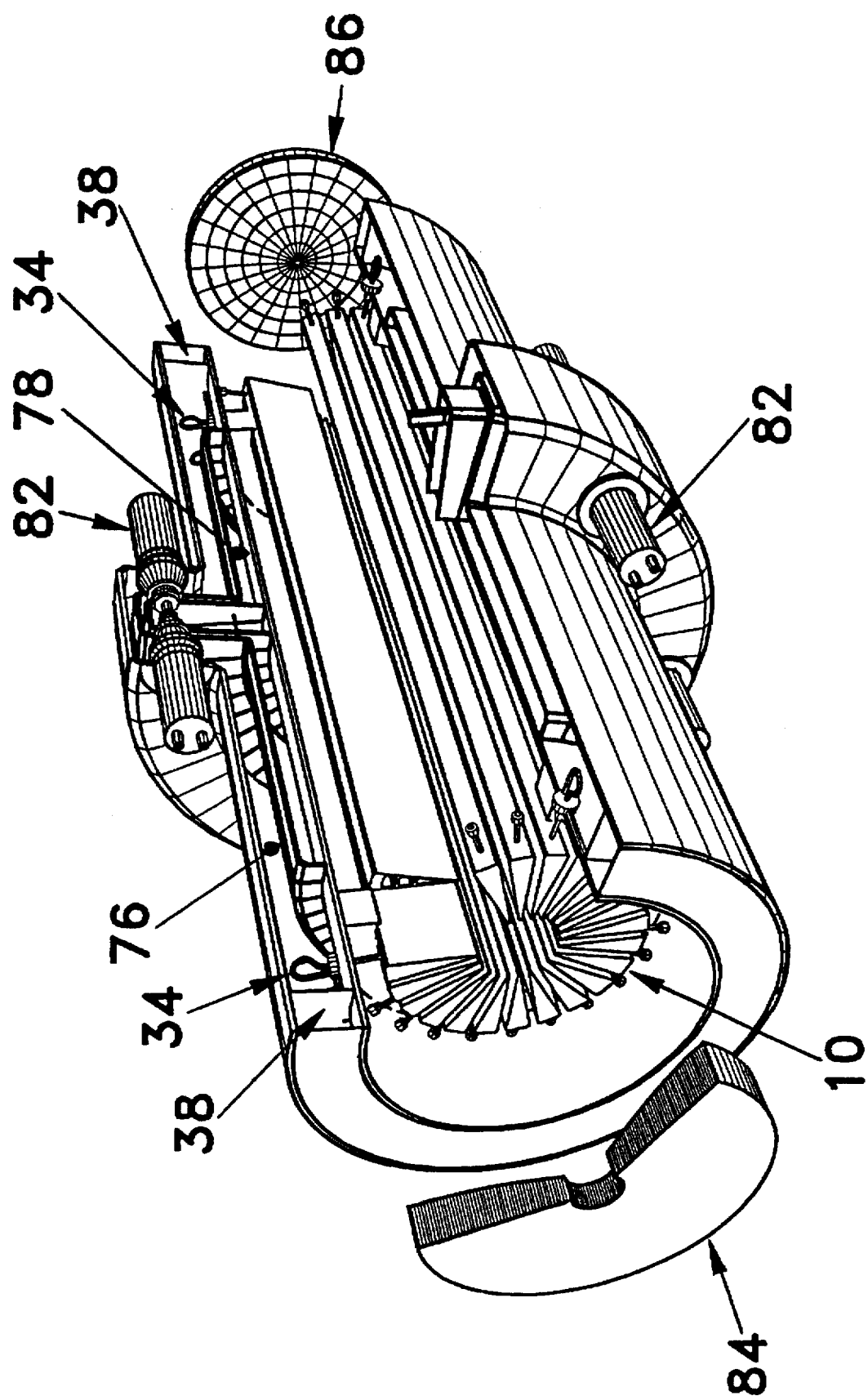
FIG. 13A, is a perspective partially cut away of a high power radial array laser having an integrated RF drive system featuring numerous smaller RF vacuum tubes, operated in parallel and mounted co-axially with the power division cavity system.
Figure 13B:
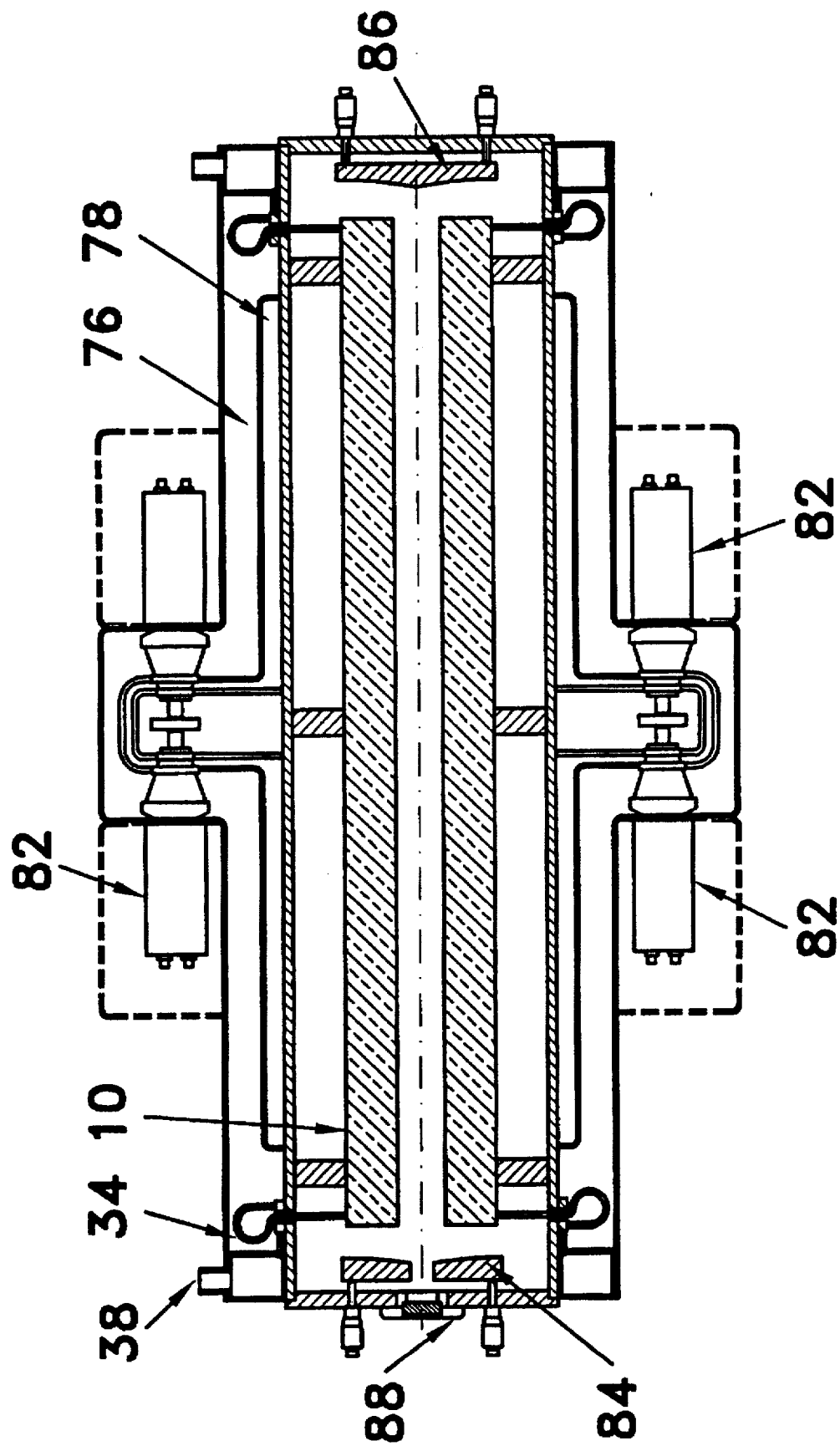
FIG. 13B, is a cross-sectional schematic drawing of a high power radial array laser having an integrated RF drive system featuring numerous smaller RF vacuum tubes operated in parallel.

FIG. 13 illustrates a modified version of the parallel tube approach of FIG. 12, utilizing many lower power devices 82 mounted co-axially with the resonant cavity system. This geometry has the advantage of further reducing the overall diameter of the complete laser.

TOROIDAL VACUUM TUBE SOURCE

Figure 14A:
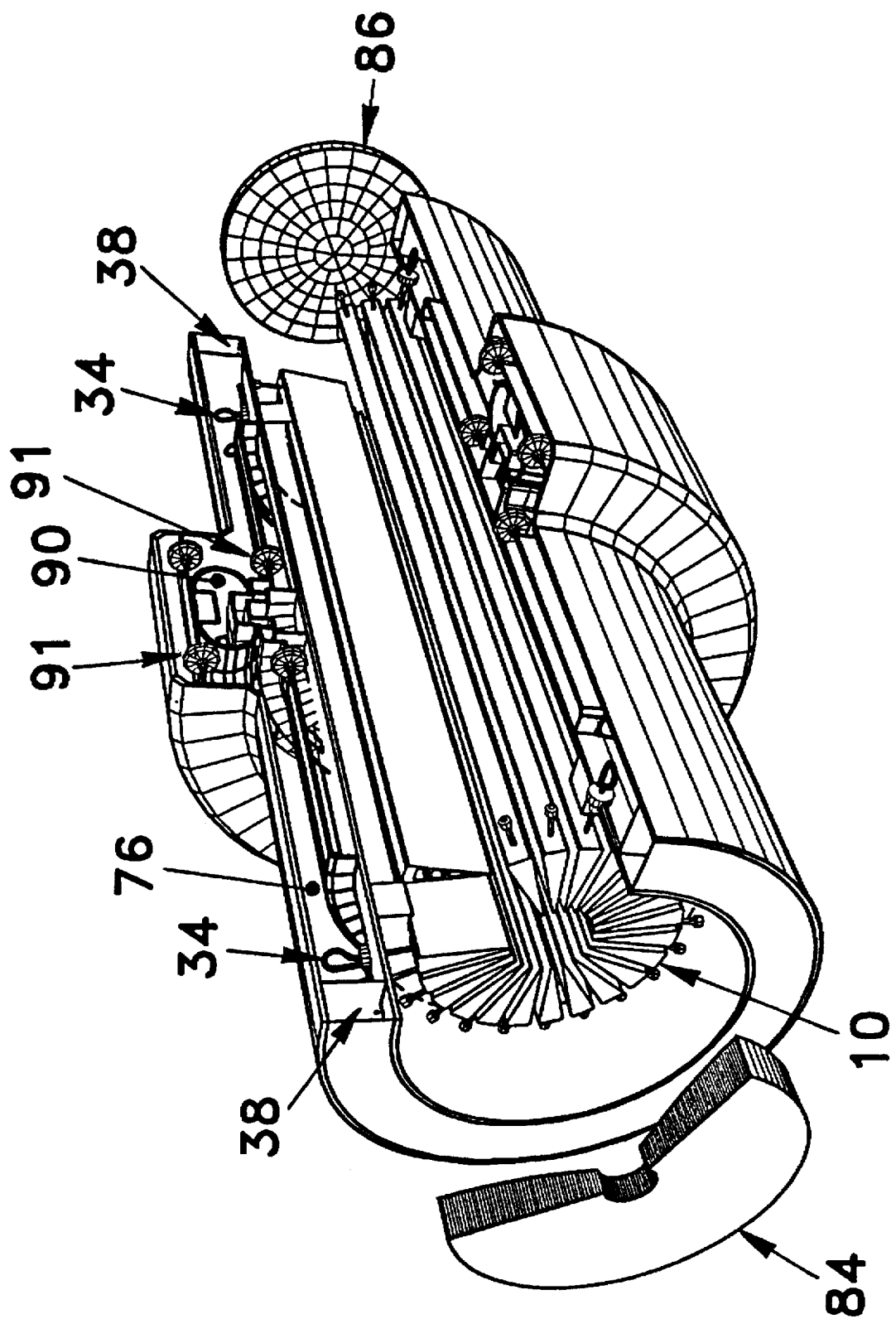
FIG. 14A, is a perspective partially cut away of a high power radial array laser having an integrated RF drive system featuring a special toroid shaped vacuum tube mounted directly within the RF resonator cavity structure.
Figure 14B:
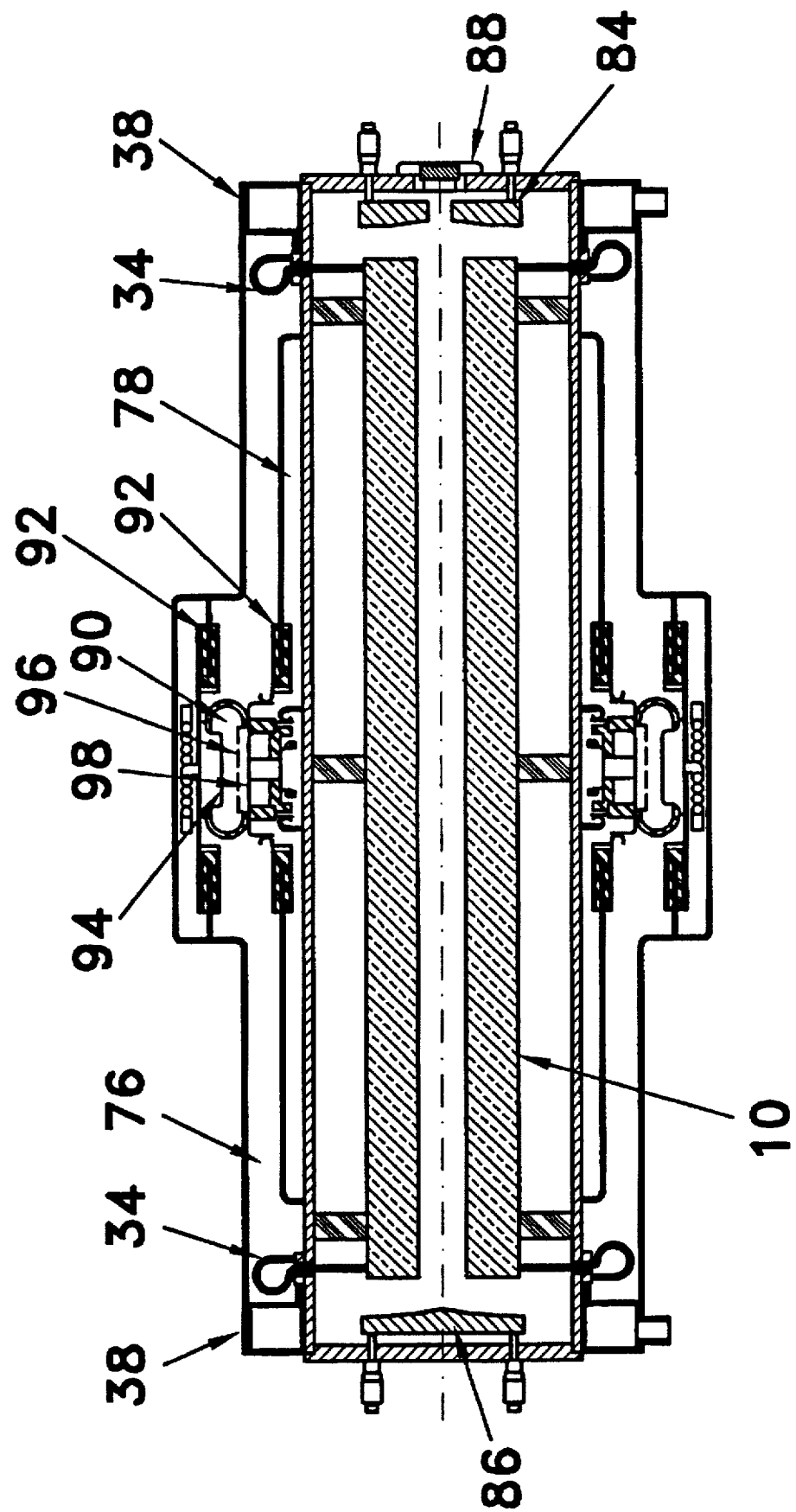
FIG. 14B. is cross-sectional schematic drawing for a high power radial array laser having an integrated RF drive system featuring a toroidal vacuum tube mounted directly within the RF cavity structure.

A further simplification and reduction in overall size can be realized through adoption of an annular geometry for the RF electronic device itself. This approach shown in FIGS. 14 & 14B, incorporates a special RF tube 90 which has been designed with a toroidal or donut shape, so that the laser body can fit inside. The device may be coupled, via lumped 91 or distributed 92 anode and grid bypass capacitors directly into the co-axial resonant cavities of the power distribution system.

Constructing an RF tube in this manner provides an enhanced frequency and power capability, since the respective anode 94, grid 96 and cathode 98 surface areas of the electronic device 90 can be made unusually large with minimal inductance, thereby providing extremely high power operation at elevated frequency.

RF ENERGY PRODUCTION AND TRANSFORMATION EFFICIENCY

It is instructive at this point to ascertain the overall efficiency in RF energy production and transformation attainable from the integration of a self-excited, electronic tube, cavity coupled oscillator with a multi-loop resonant cavity power division and impedance matching system, as depicted in FIGS. 9 through 13. This determination is accomplished by examining the extensive analysis performed previously for microwave sources.

In order to sustain steady state oscillation conditions, the negative conductance of the electronic tube must be equal in magnitude to the positive conductance of the external load, (i.e. mod $G_{elect}$=mod $G_{ext}$. Since the cavity transformation efficiency equation seen earlier still holds, one need only introduce the electronic conversion efficiency of the electronic tube $n_{elect}$ to determine the overall system efficiency $n_{overall}$. In equation form this becomes:

$$n_{overall} = n_c \cdot n_{elect}$$

Although with proper design and construction the cavity transformation efficiency $n_c$ can approach 100%, such is not the case for the electronic conversion efficiency parameter $n_{elect}$. Never-the-less, under optimum loading and DC drive conditions, utilizing high performance ceramic tubes, featuring graphite anodes, grids, and dispenser cathodes, this term can still exceed 80%.

From these discussions, it is clear that this integrated resonant cavity RF energy source and power division concept can provide an exceedingly efficient laser system at very high power and in a very small package, near an order of magnitude less costly than conventional oscillator-amplifier systems.

Examination of the overall efficiency equation above and the previous cavity transformation equation, reveals that best performance is obtained under heavily over-coupled external load conditions. However, in practice there is a upper limit to the amount of external loading that can be employed, since the electronic device will eventually be unable to develop the magnitude of negative conductance required to initiate or sustain RF oscillations. However, if the electronic tube is to be used only as an amplifier, then overcoupling is preferable to maintain stability.

PHASE LOCKING CONSIDERATIONS

As indicate previously, it has been well elucidated in the scientific literature that an array of N individual phase-locked laser beams may be focused to a spot size which is inversely proportional to the square root of the number of beams stacked. Thus, the brightness of the composite beam increases as the square of the number of beams combined.

In order to capitalize on this beneficial focal spot narrowing effect with concomitant increase in beam brightness, a number of methodologies for phase locking multiple lasers have been advanced. The more common of these are, optical mode sharing, Talbot intra-cavity spatial filtering, nonlinear optical coupling, external injection in a master oscillator power amplifier or MOPA approach, and adaptive optics.

Examination of the results from the experimental investigations performed using the techniques outlined above reveals that, although phase-locking of each of the individual lasers in the array is indeed a necessary condition to obtain the maximum increased brightness, it is not a sufficient condition.

Specifically, in order for each beamlet to constructively interfere and contribute to a single common focal spot having an $N^2$ brightness, all the lasers in the array must be uni-phase (i.e. have exactly the same phase). If this is not the case, multiple focal spots will be obtained. This highly undesirable situation is well documented in the literature.

Although some work has indicated that phase differences between the individual gain channels in a phase-locked laser array can in some cases be compensated for with phase shifters, or phase retardation plates, etc. the approach is not only cumbersome and expensive, but also introduces an additional undesirable optical system alignment and instability problem.

In this context, a much more desirable approach is to arrange that uni-phase-locking is inherent in the basic design of the multi-channel array structure. Such is the case with the radial array geometry, since all beamlets not only share the same common optical resonator and extraction system, but further have identical physical optical path lengths throughout the multiple gain channels, comprised of distributed gain media of exceptional similarity, symmetry and uniformity.

OPTICAL ENERGY EXTRACTION CONSIDERATIONS
UNSTABLE RESONATOR

Figure 15:
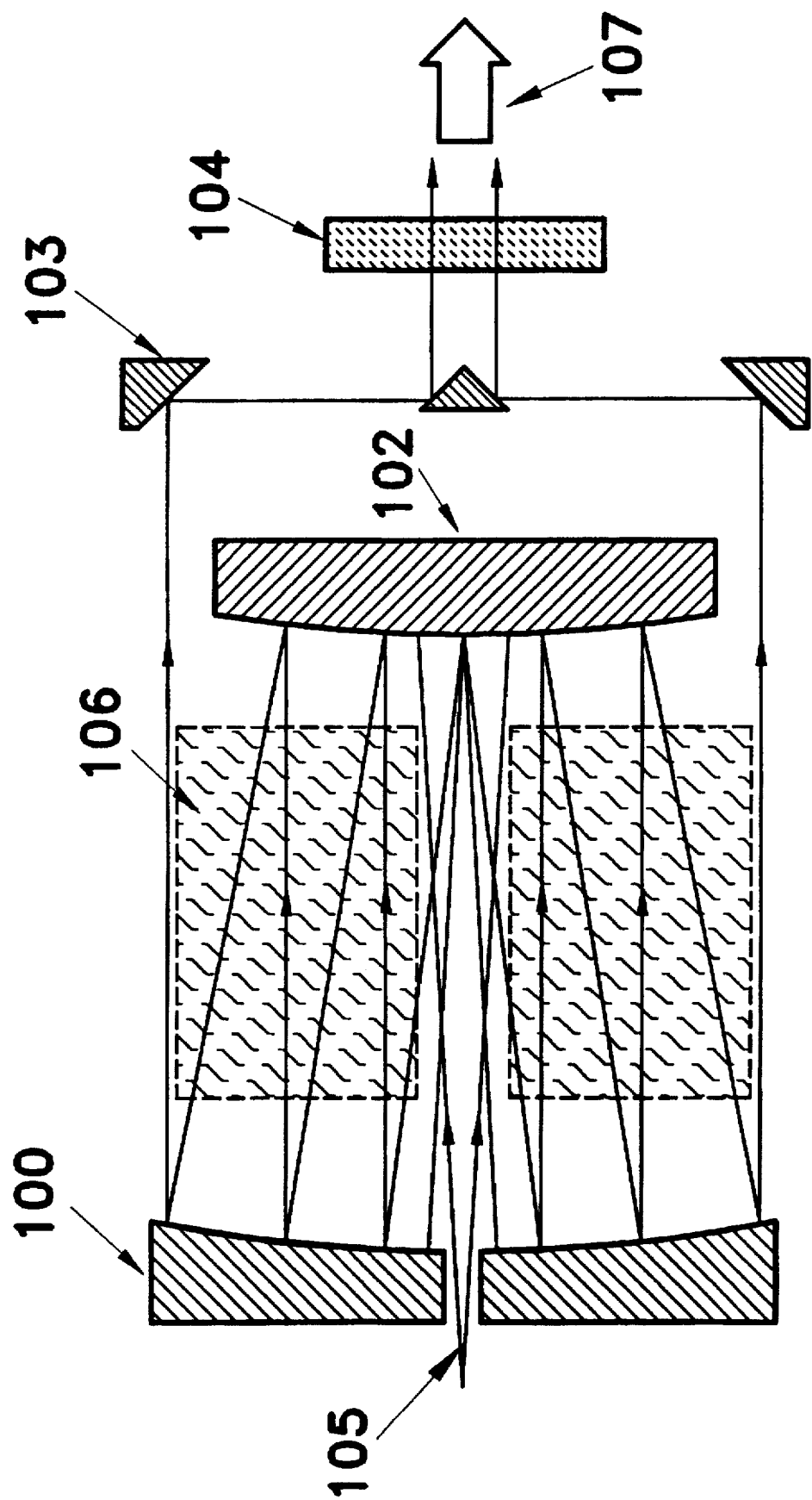
FIG. 15, is a schematic of an unstable resonator having provision for external injection, for use with a radial array discharge system.

As described in my previous U.S. Pat. No. 5,029,173 and my European application #91302297.6, a large number of optical resonator configurations may be employed to provide laser energy extraction from the basic radial array structure. This includes the conventional unstable resonator of FIG. 15, comprised of primary and secondary mirrors 100 and 102 respectively. A beamlet compacting axicon 103, output window 104, and provision for internal-injection 105, for multi-channel phase locking of the multi-channel gain media 106, are included to extract a high quality, coherent and collimated output beam 107.

TORIC RESONATOR

Figure 16:
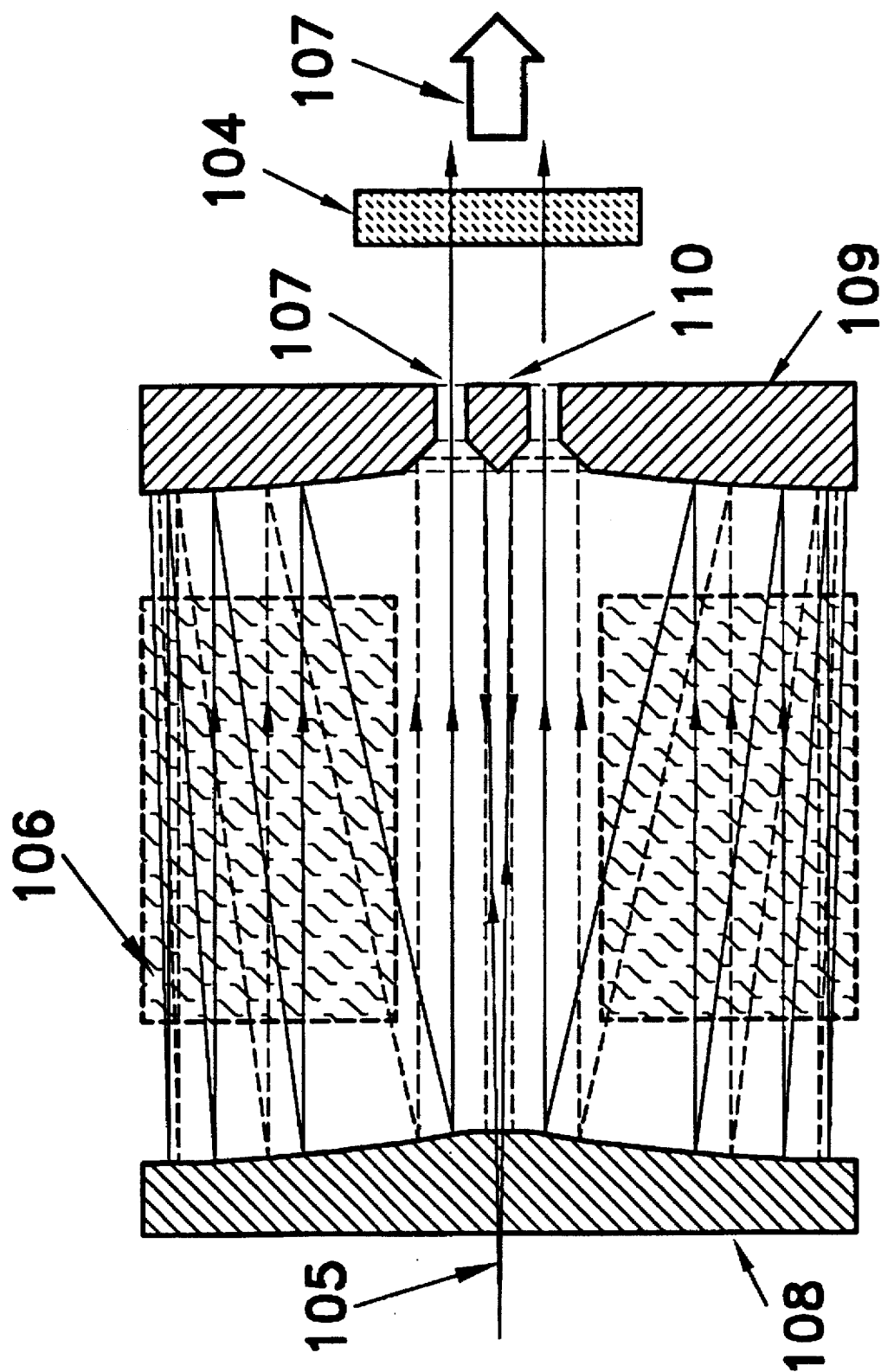
FIG. 16, is a schematic of a Toric resonator having multiple phase-locked loops and provision for external injection.

In the phase-locked-loop toric resonator of FIG. 16, comprised of primary and secondary mirrors 108 and 109, the output 107 is taken over-the-edge of the internal feedback axicon 110 via the output window 104. Oscillator injection 105 for external phase locking of the multi slot gain media 106 is again derived through a small opening in the primary mirror along the centerline.

ANNULAR COUPLED STABLE RESONATOR

Figure 17:
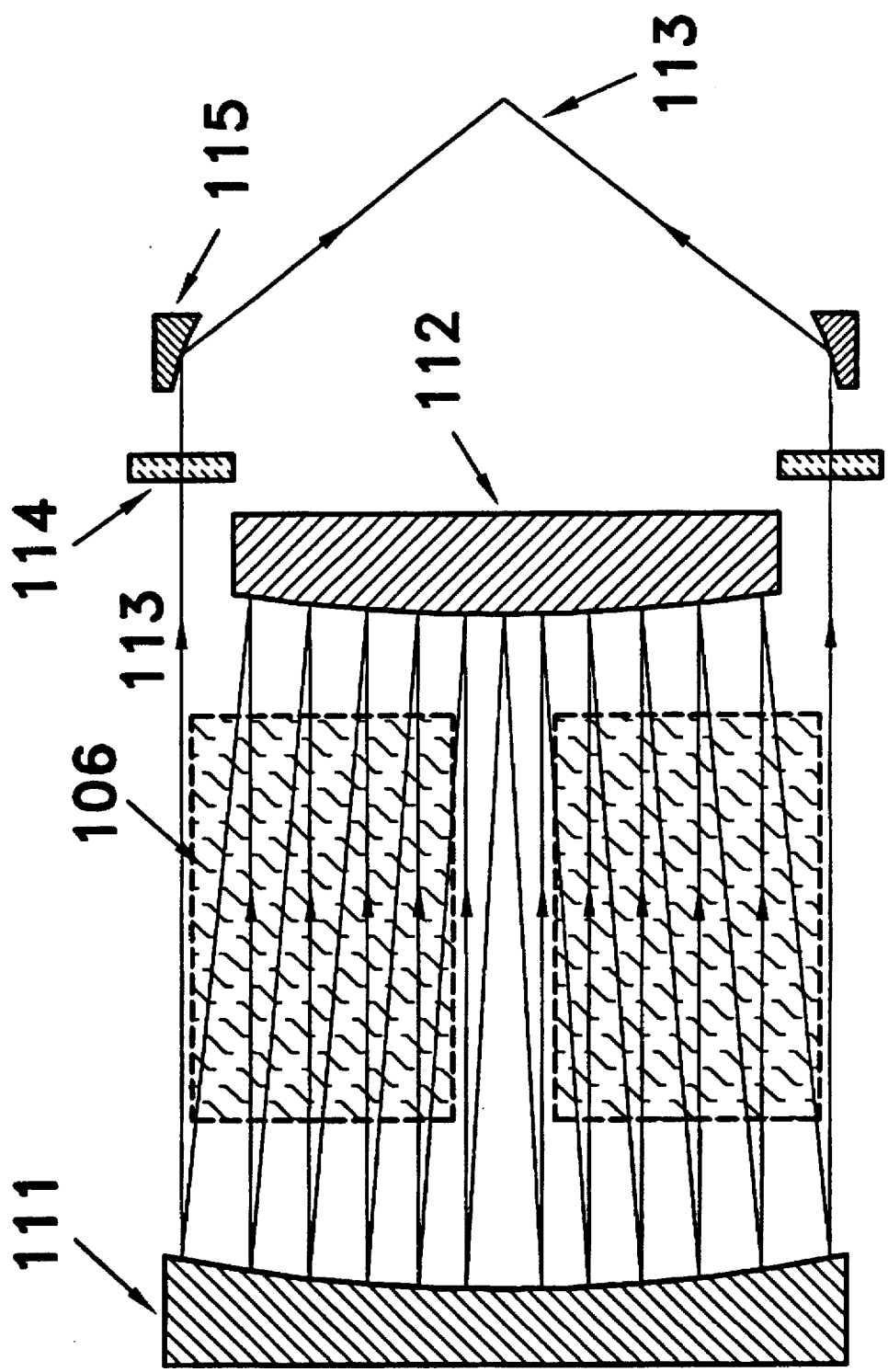
FIG. 17, is a schematic of a radial array laser featuring an annular coupled convex-concave stable optical resonator for external or self-injection phase locked performance.
Figure 18:
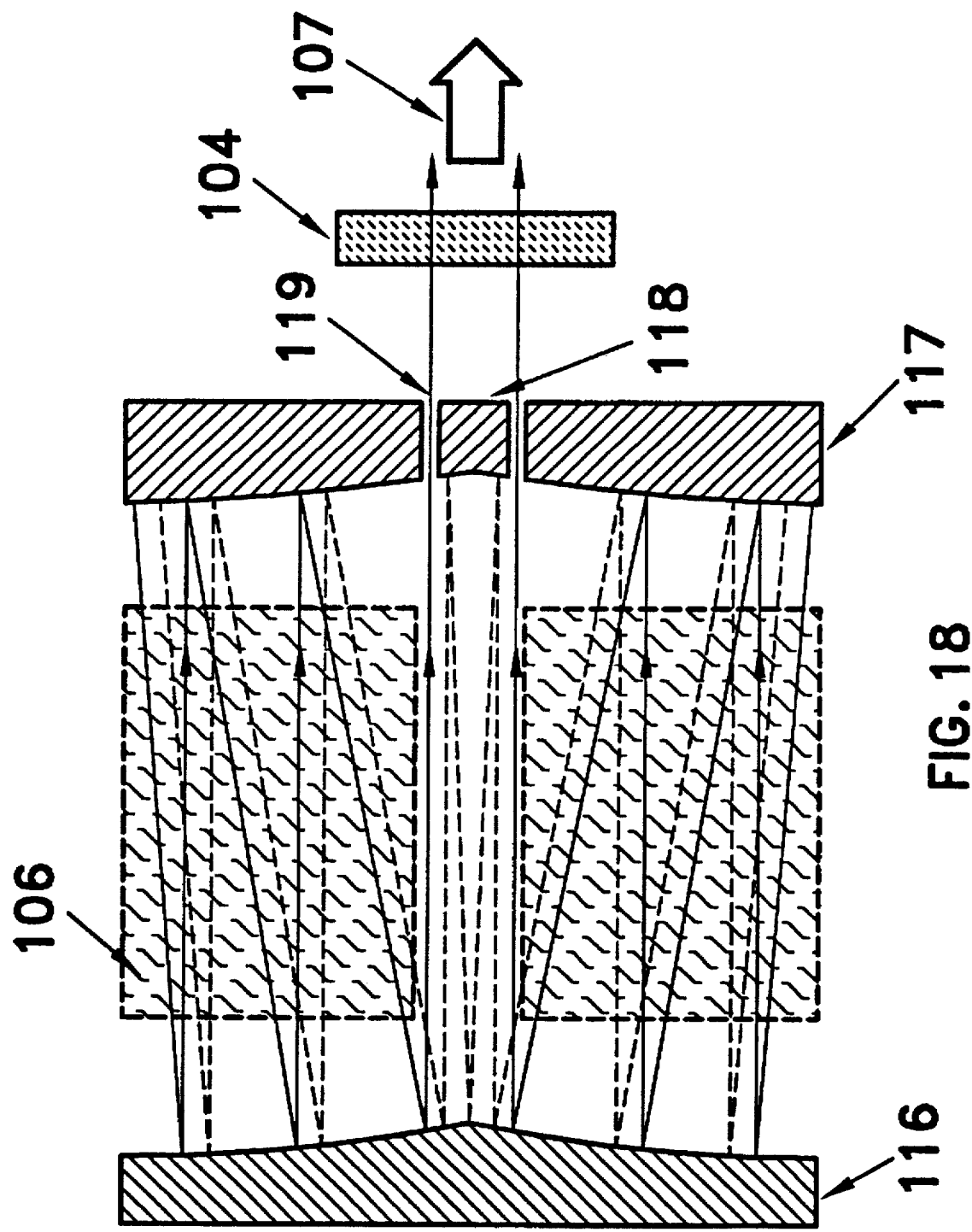
FIG. 18, is a schematic of a radial array laser featuring an iris coupled stable toric resonator for self-injection phase locked performance.
Figure 19:
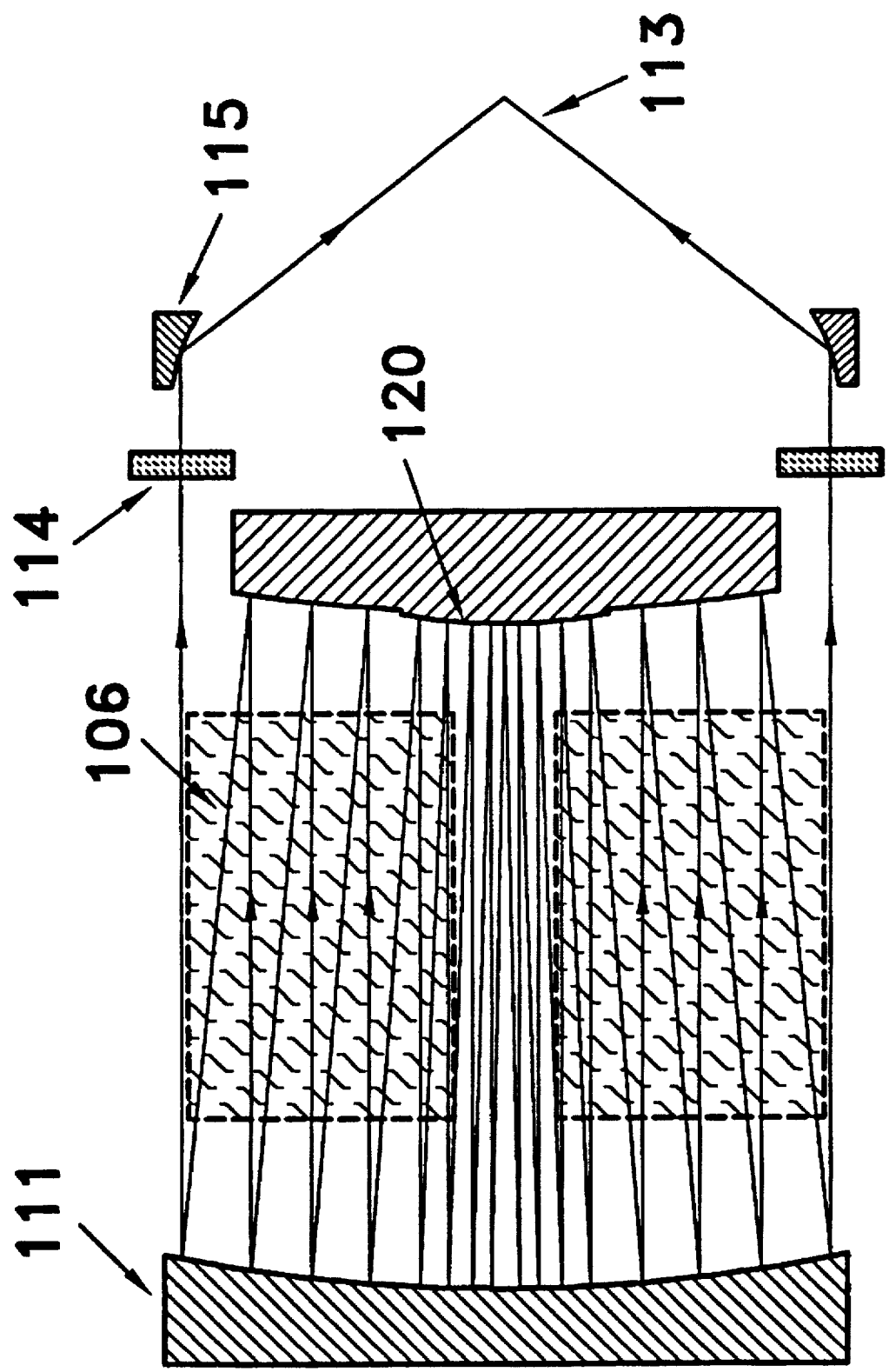
FIG. 19, is a schematic of a radial array laser featuring a stable-unstable super-regenerative MOPA optical energy extraction system for phase locked performance.

FIG. 17,18&19 illustrate alternate optical extraction systems recently developed, which provide more efficient self-injection phase locking than that afforded by the configurations given previously. FIG. 17 depicts an "annular-coupled concave-convex" optical resonator that may be adapted to the multichannel radial array geometry to provide simultaneous mode coupling to the multi-slot radial gain channels. This stable resonator, was originally developed to improve the mode quality of a large volume PIE laser.

The approach relies on the generation of 2 stable modes, the $TEM_{00}$ and the $TEM_{10}$, within the primary and secondary cavity mirrors 111 & 112. Only the latter mode is over-the-edge diffractively coupled out as a multiplicity of beamlets 113. The advantage of using this type of resonator for these radially mounted multiple gain channels 106 is that the first order stable $TEM_{00}$ mode may be confined to the central clear region of the resonator and used as a core oscillator to inject phase locking energy into the surrounding slots via coupling with the $TEM_{10}$mode.

The net result is a highly uniform, stable and well phase locked multiplicity of beamlets, which can be conveniently coupled out of the structure through small and inexpensive Anti Reflection coated Znse windows 114, and easily focused to the work piece; possibly by an all metal Wolter lense 115 as illustrated in FIG. 17.

IRIS COUPLED STABLE RESONATOR

FIG. 18 illustrates another convenient optical extraction system useful for radial array laser applications. In this modification, the normally unstable toric resonator composed of primary and secondary mirrors 116 and 117 has been converted into a stable mode structure, by mean of a positive feedback central mirror 118 machined integrally with the output mirror 117. The degree of output coupling is controlled by the size of the annular coupling iris 119.

In this configuration the laser beam 107 is extracted near the centerline as an annulus, via the output ZnSe window 104. The advantage of this resonator configuration is again the high level of phase locking mode injection that can be obtained via the central core oscillator region of the structure.

HYBRID MOPA RESONATOR

A further optical extraction system, herein termed a "hybrid stable-unstable or MOPA resonator", that may be useful employed with the radial array gain structure, is depicted in FIG. 19. This geometry is very similar to that shown previously in FIGS. 17, being composed of primary and secondary mirrors with small output coupling windows. The major change is that the secondary mirror 120 has a compound radius of curvature which converts the central region into a stable cavity mode.

Thus, the core oscillator region may be made much larger and more intense than is possible with a conventional unstable mirror. As such, this central region can be used to inject well phase locked radiation into each of the surrounding gain slots. The result is again a multiplicity of highly phase coherent beamlets, diffractively extracted over-the-edge as shown. In this context, the optical extraction configuration of FIG. 19 is in reality a "Master-Oscillator Power-Amplifier or MOPA" system.

It is important to note here that the 3 stable optical resonator configurations depicted in FIGS. 17,18&19 are equally suitable for high quality optical energy extraction from a single channel narrow-gap wide-slot laser system, operating either in a waveguide or non-waveguide mode.

ALTERNATIVE EMBODIMENTS FOR VERY HIGH POWER

The optical power that may be extracted from the radial electrode configurations outlined thus far may be greatly increased by constructing the device with many more gain channels, and with each electrode having a greater width. Using this approach, one can predict that a radial array laser with 100 electrodes, 10 cm wide and 1 meter in length, can produce an average beam power of about 200 kW from a physical package only 40 cm in diameter. However, even much greater laser power levels than this value can in principle be derived by incorporating several radial electrode systems into a single compound structure.

COMPOUND radial array STRUCTURE

Figure 20:
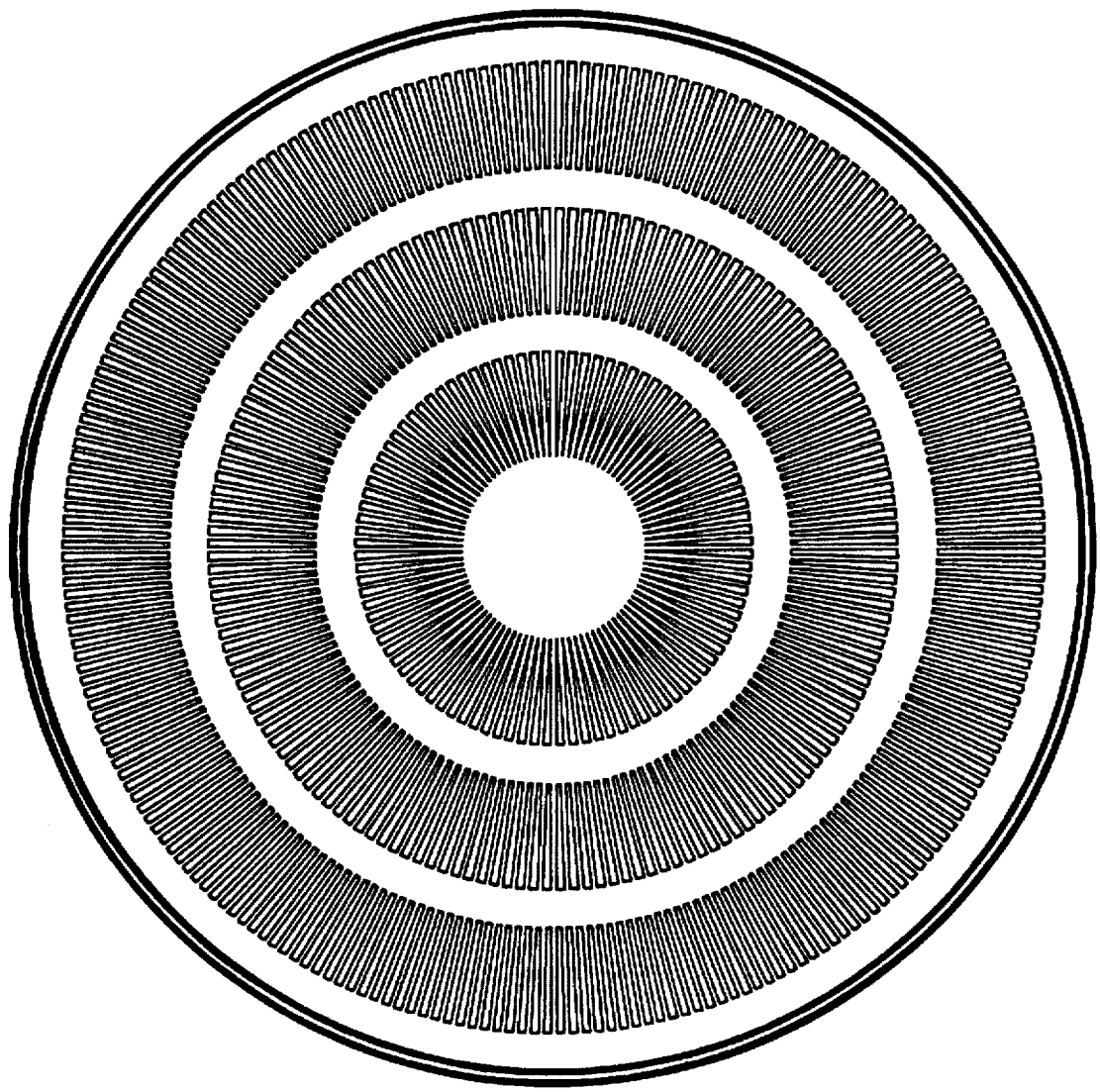
FIG. 20, is a cross-sectional schematic of a TRIPLE radial array electrode structure having 500 individual gain channels.
Figure 21:
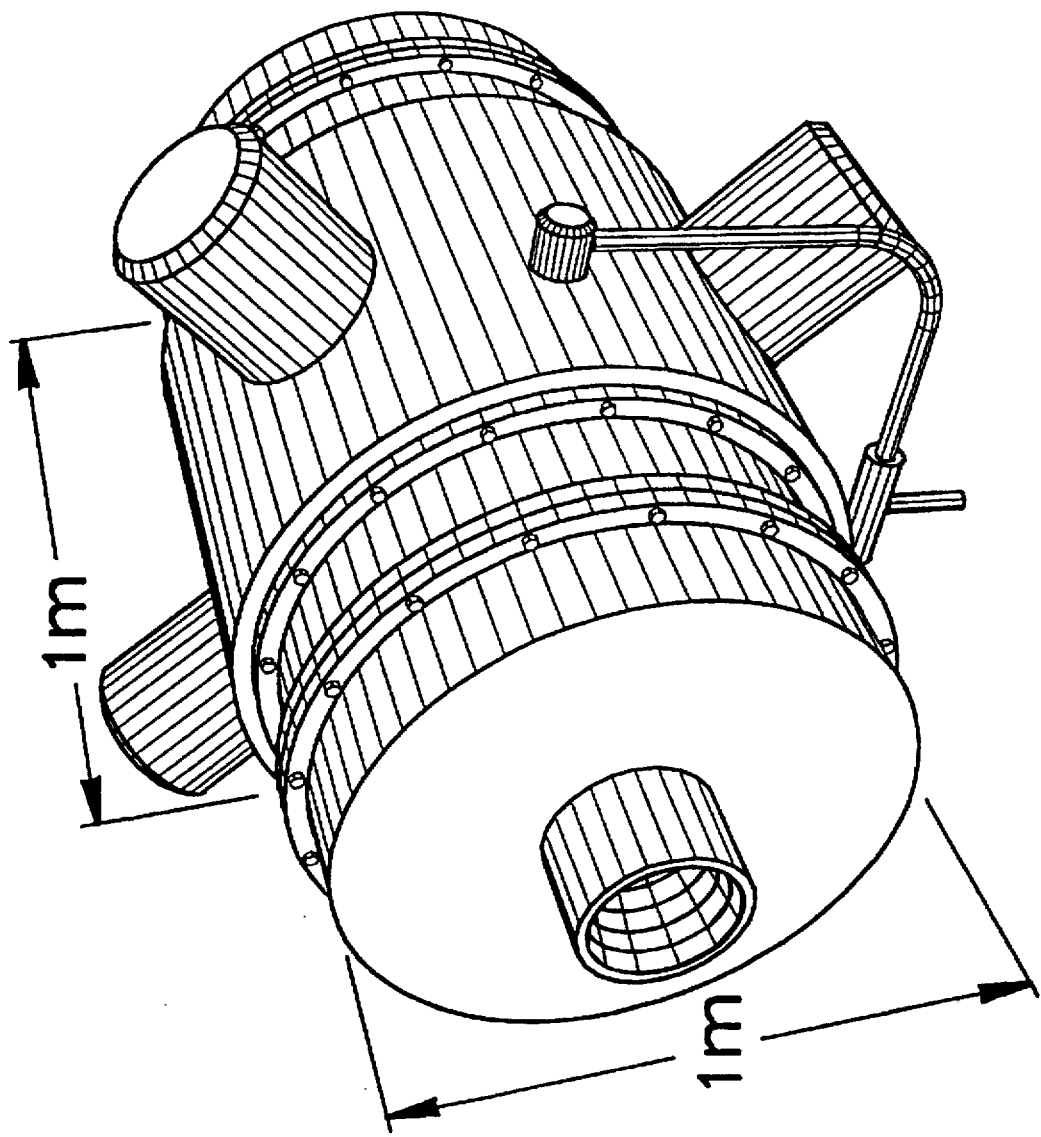
FIG. 21, is a perspective of a super high power radial array laser featuring a triple multi-channel gain geometry driven by 4 megawatt level RF vacuum tubes via a co-axial resonant RF cavity power division and multi-magnetic loop coupling system.

This concept is illustrated in FIG. 20 by the "TRIPLE radial array". Examination of the schematic reveals that 500 independent, 10 cm wide gain slots are contained within an overall geometry having a diameter of only 1 meter. The multi—channel gain system derived in this manner may be utilized in the construction of a Super High Power radial array Laser, as depicted in FIG. 21. Such a device, could generate an incredible average beam power of about 1 MW.

RF excitation energy for the system may easily be derived from several high power ceramic triodes mounted into a common resonant cavity distribution system as described earlier. In this context, recent advances in high power vacuum technology have resulted in the generation of compact electronic devices having average RF power capabilities of several megawatts each. Pulsed versions of these units can further provide RF powers in the 10 megawatt range. Compound or multiple section radial array devices constructed in the general manner illustrated in FIG. 21, could possibly be used as anti-missile laser cannons for defensive purposes.

GIANT PULSE OPERATION

It is clear from the previous discussions that the various radial array structures can be operated either CW or pulsed, merely by changing the grid drive conditions to the high power vacuum tube RF power source. In recent years, a major operational advance has been made possible through the construction of these ceramic tubes with a "dispenser" cathode. This type of cathode has the capability of supplying near 2 orders of magnitude higher electron current, under short pulse conditions. As such, a 100 KW average power tube can produce several megawatts of peak RF energy under short pulse conditions.

Because of this fact, it is feasible to develop a pulsed radial array laser with a simultaneous high average and peak power capability. The implications are that a high repetition rate GIANT PULSE radial array LASER can now be built having a peak optical output power near 1 megawatt, at a rep rate approaching 1000 pps and an overall average power of 10 KW; all from a package only about 120 cm long and 35 cm in diameter. Such a device would have wide application in industry for the environmentally safe ablative removal of toxic lead paint and other carcinogenic coatings used world wide in the protective coatings industry.

RADIAL ARRAY EXCIMER & CO LASERS

Since this new generation of ceramic RF tube can be used for driving the radial array electrode system under giant pulsed conditions, it is also feasible to substitute an Excimer laser gas mixture for the normal carbon dioxide mixture, and thereby derive a "radial array EXCIMER LASER" with little additional effort. In principle the concept should be applicable to any gas discharge pumped laser system, including refrigerated systems such as CO.

ALTERNATIVE COMPOUND EXTRUDED ELECTRODE EMBODIMENTS

Research has shown that under short pulse excitation conditions, the RF created laser-plasmas within the multiplicity of large area, narrow gap, gain channels is extremely stable, even in the absence of individual RF feed. As such, one can greatly simplify the construction of a pulsed radial array laser, by further utilizing extrusion techniques in manufacture. This "compound extrusion" construction concept is illustrated in FIGS. 22,23,24&15.

Figure 22:
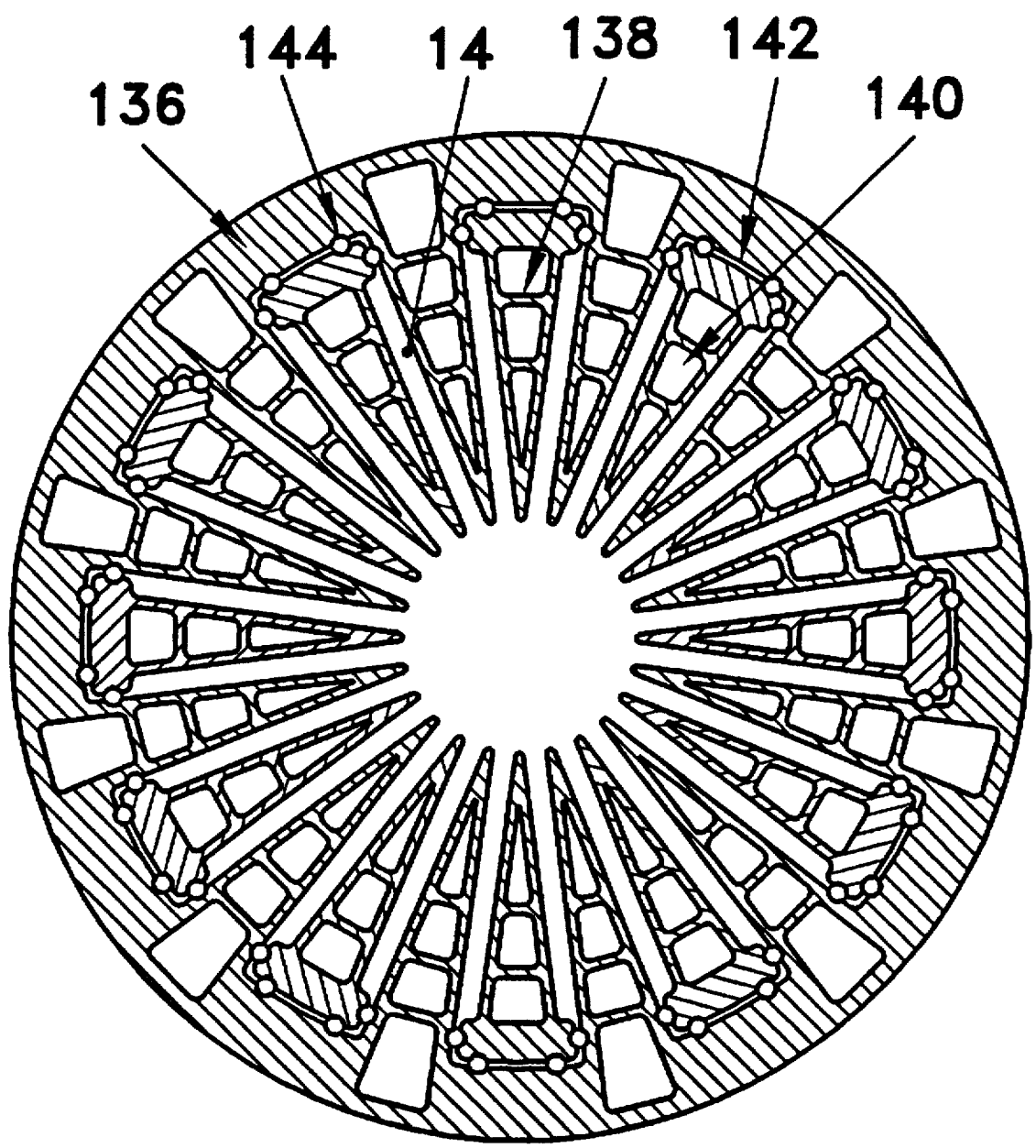
FIG. 22, is a cross-sectional drawing for a high power radial array laser having a continuous common extruded outer shell serving as part of the electrode system.

In FIG. 22 the water cooled cylindrical chamber 136 served both as the hermetic enclosure for the laser as well as each alternate electrode 138 for the narrow gap discharge 14. The intermediate electrodes 140 are insulated from the first electrodes 138 by high thermal conductivity dielectric material 142 and held in place by dielectric rod segments 144.

An alternative to the thin insulating material 142 is to use an extremely narrow gas gap. As is well known in plasma physics, if the width of this gap is made less that the "Paschen Minimum" no electrical breakdown will occur, and thus the gas gap will serve as an insulator having reasonable thermal conductivity.

Figure 23:
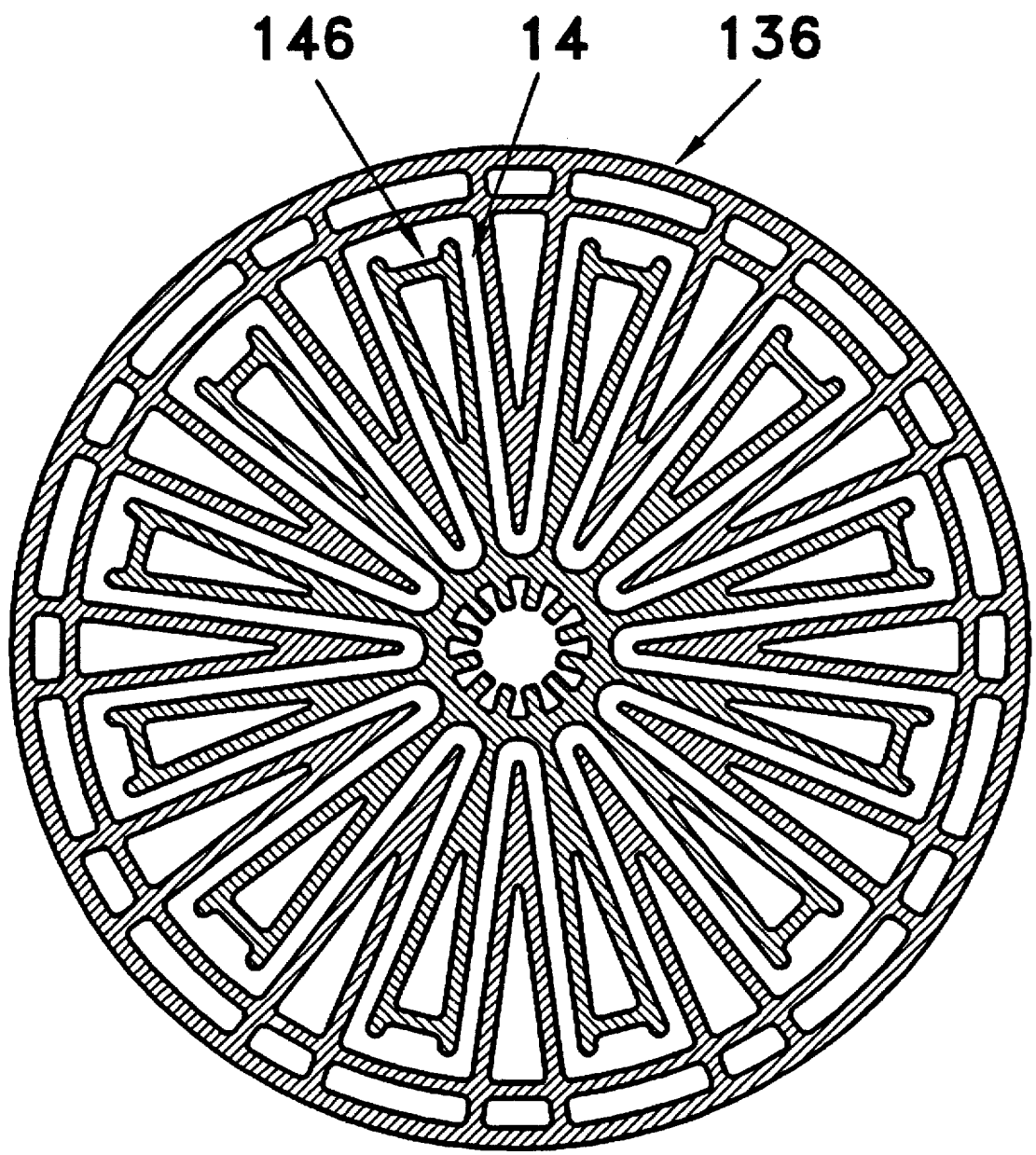
FIG. 23, is a cross-sectional drawing of an All Extruded radial array electrode system featuring common inner and outer electrode sections.

Under very short pulse operation, the COMPOUND EXTRUDED geometries of FIG. 22 may be employed to both further simplify construction and reduce cost, as shown in FIGS. 23&24. Here both the outer electrodes 136 and the inner electrodes 146 are extruded as single complete water cooled assemblies. This approach also greatly simplifies assembly, since only a few appropriately positioned dielectric spacers are required to maintain the multiplicity of narrow gap discharge channels 14.

If the laser system is constructed with very small discharge gaps such as 2 mm, then about 2 watts/cm$^2$ of CW laser power are extractable from each square centimeter of electrode area in the structures of FIG. 24. Thus, the 12 slot unit shown can deliver near 25 W per centimeter of laser length, while the 24 slot device can produce about 50 W/cm of discharge length. This being the case, it is apparent that high rep rate pulsed lasers having average output power levels of several kilowatts can be obtained from portable devices fabricated by these compound extrusion techniques.

EMBODIMENTS FOR MINIATURE LASERS

Figure 25A:
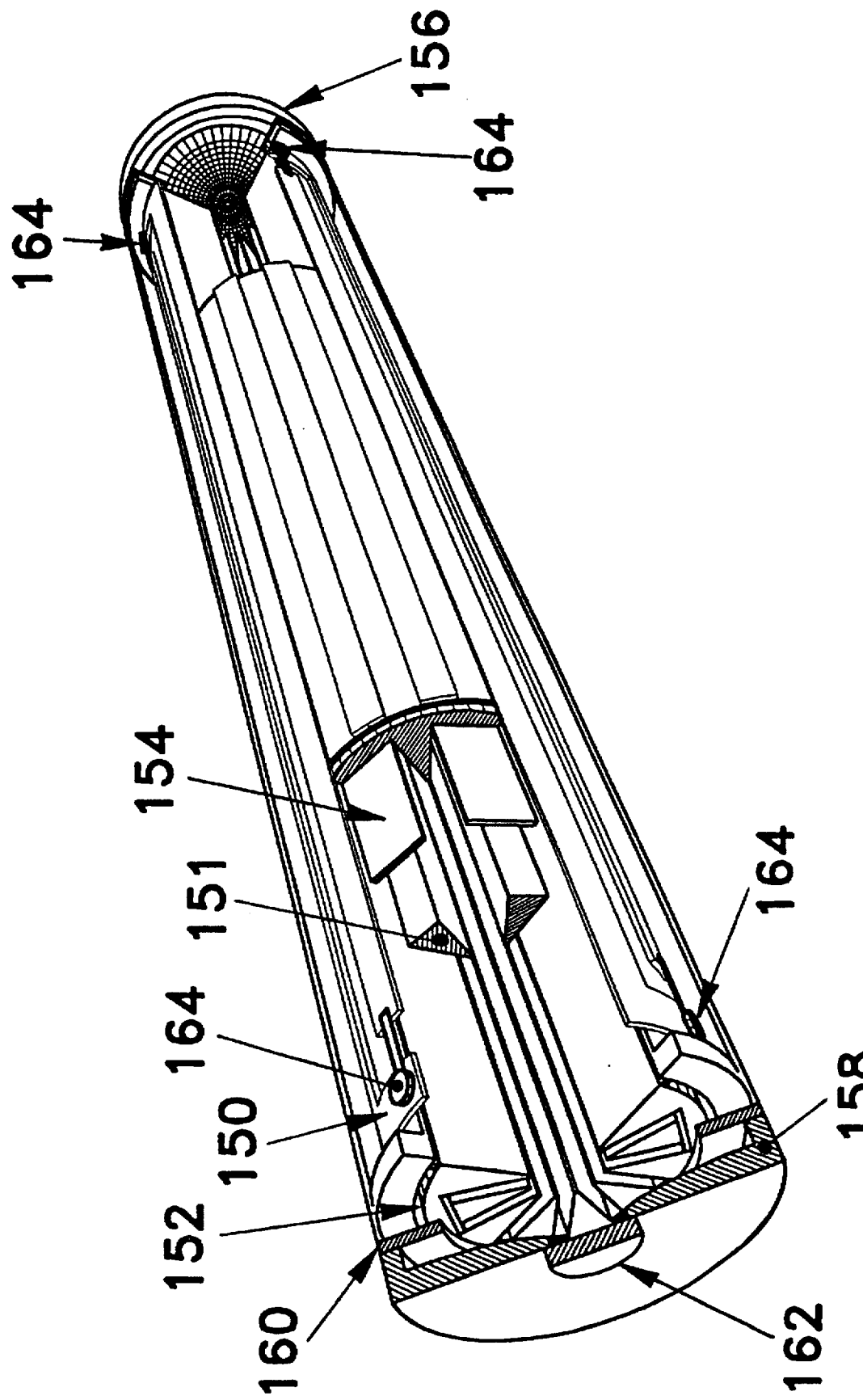
FIG. 25A, is a perspective partially cut away of a miniature radial array laser utilizing stripline resonators for multi-channel RF power division and impedance matching to each electrode segment.

It follows, that the above radial array geometrical features and construction techniques that permit attainment of high powered lasers in small packages, can also be exploited to provide miniature lasers with physical dimensions compatible with hand-held usage. In this context, FIG. 25 shows a MINI radial array laser with a diameter and length of only 4 by 20 cm. An output power near 250 W, with greatly reduced size, renders the device amenable to medical applications.

STRIPLINE RF RESONATORS

To facilitate miniaturization, microwave stripline techniques have been employed for constructing the resonant RF power division and impedance matching system 150. Also, cooling of the electrodes 151 is accomplished by conduction from a surrounding water jacket 152, through a high thermal conductivity insulator such as Alumina or Berillia 154, rather than through water passages extruded directly within the electrodes, as is the case in larger systems. It will be appreciated that the stripline resonator comes under the general meaning of the term cavity type resonant circuit.

RF drive energy for the multiple electrodes may be derived from a multiplicity of high frequency transistors 164 integrated directly into each stripline resonator, or alternatively may be derived through multiple microdot RF feeder cables, connected to a remote but common RF source, either vacuum tube or transistorized. Primary and output mirrors 156 and 158 respectively can be integrated directly into the vacuum enclosure 160. Laser output is derived via a ZnSe window 162. Enhanced laser performance may be obtained by fabricating this output window with a partially reflecting coating near the centerline, to provide internal feedback for increased multichannel phase locking.

Figure 25B:
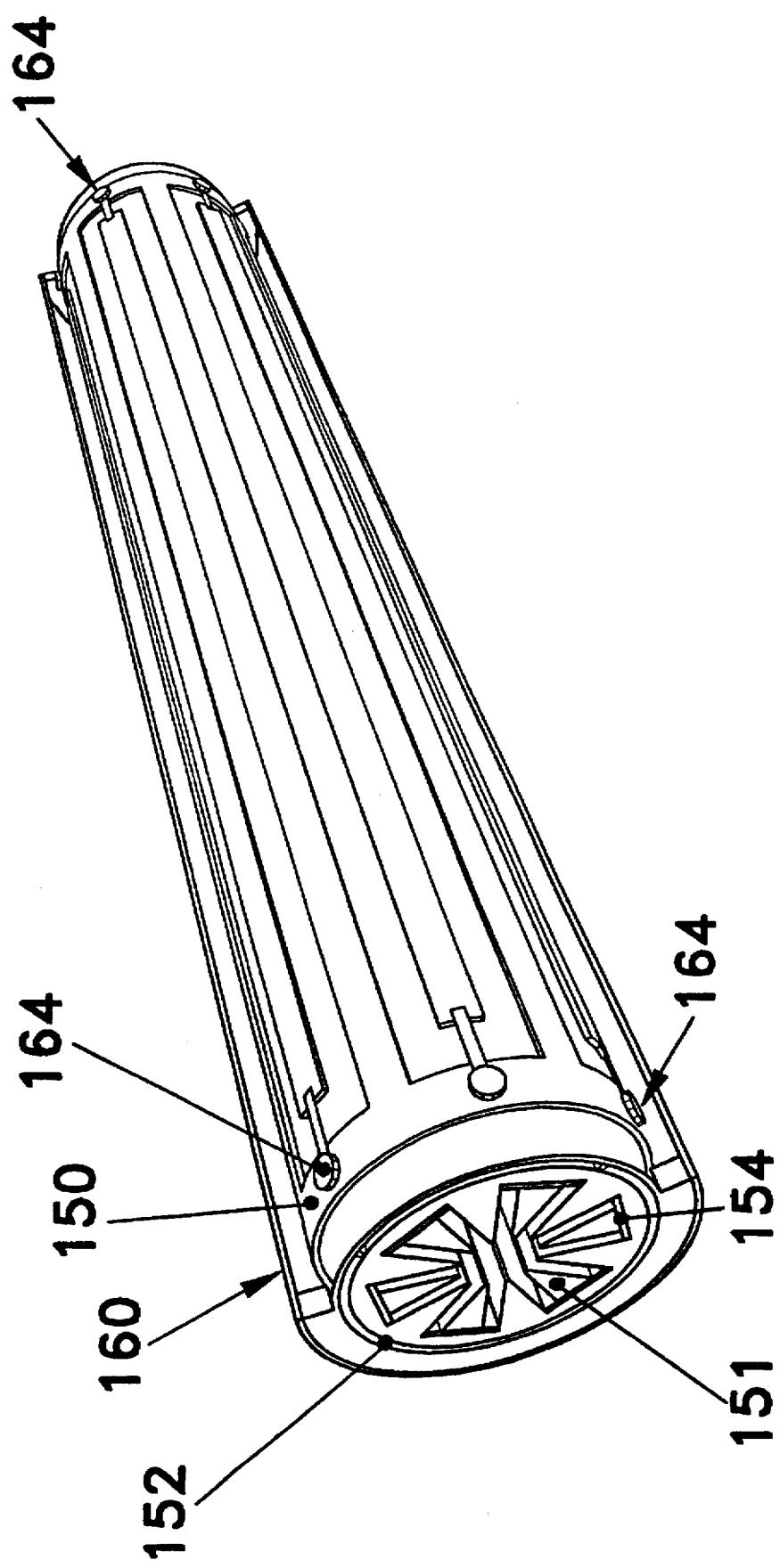
FIG. 25B, is a simplified perspective partially cut away of a miniature radial array laser showing multiple transistor driven strip line resonators for driving each electrode segment.

The design concept herein, in the multichannel stripline resonator RF drive system for the miniature radial array laser of FIG. 25 is more clearly illustrated in the simplified isometric drawing of FIG. 25B. As can be seen the system is comprised of multiple quarter-wave circuit board type RF resonator structures fabricated on a cylindrical metal-clad ceramic insulated circuit board, which is then slid over the outer diameter of the water-cooled laser vacuum enclosure 160 of FIG. 25. The electrical principles of this type of RF resonator structure is well described in the art.

OUTPUT BEAM CONSIDERATIONS

The output beam profiles derived from narrow gap wide slab lasers are characteristically non-uniform with a non-unity aspect ratio, due to differing divergences in quadrature. As such, it is difficult to utilize such beams in high quality materials processing applications, unless some type of optical compensation is provided. The problem becomes increasingly difficult when multiple slab laser beams are combined to provide enhanced overall beam power.

RADIAL BEAM STACKING

Since the radial array laser also features a multiplicity of beamlets derived from narrow gap gain channels and compacted into a single beam, it might be expected that the device would similarly suffer from beam nonuniformity and asymmetry. Results have revealed however, that this is not the case, due to an inherent RADIAL BEAM STACKING compensation. This highly beneficial effect is examined in FIGS. 26 through 28.

Figure 26:
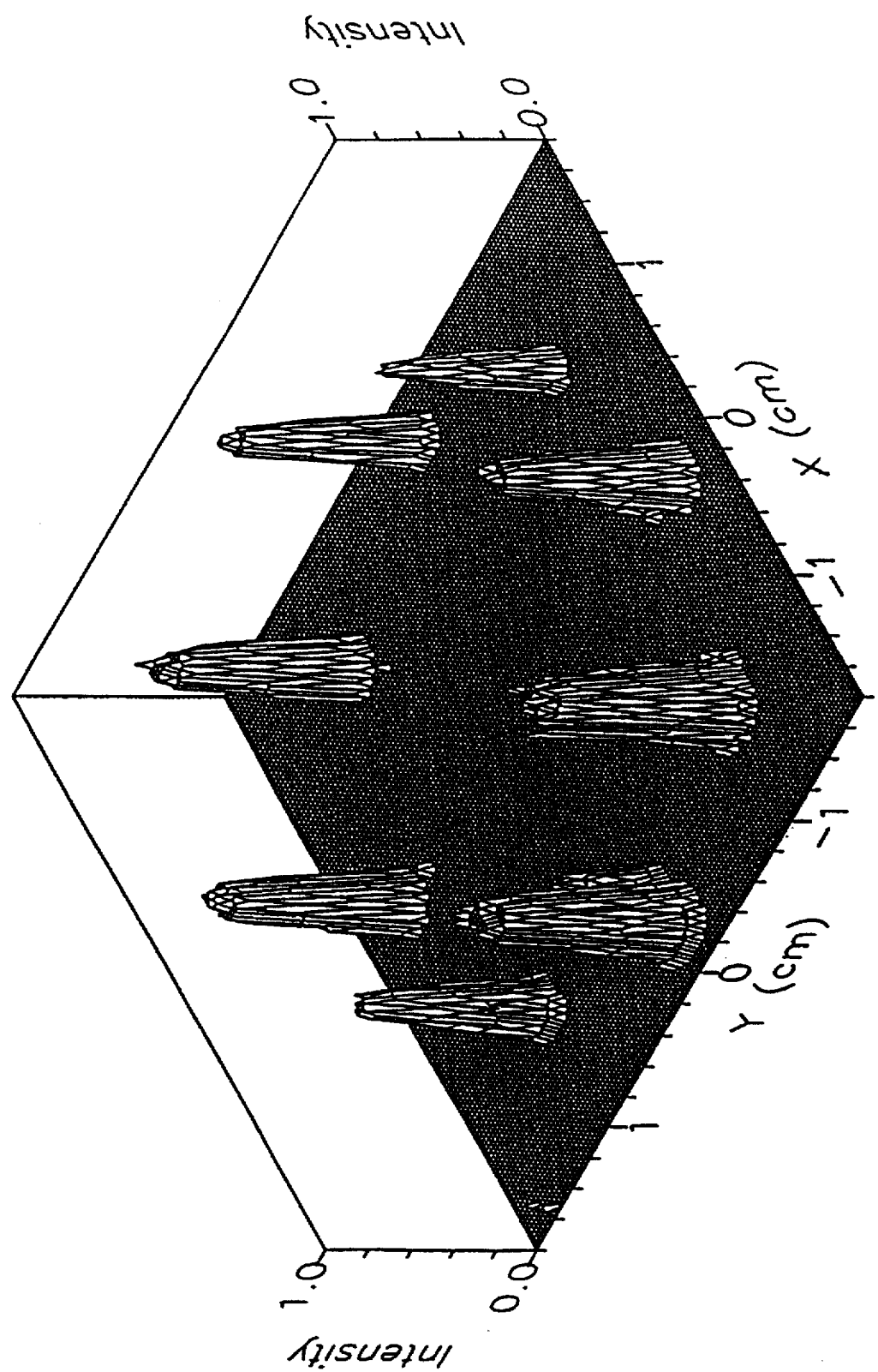
FIG. 26, is a computer re-generated profile of the measured output beamlets derived from an 8 slot radial array laser system.

The non-symmetric aspect ratio and intensity variations between typical beamlets derived from an 8 channel radial array test structure is evident in the profiles of FIG. 26. This profile was measured and then computer re-generated by a special beam profiling system recently developed. Polarization measurements indicated that each beamlet is linearly polarized parallel to the electrode faces. No attempt was made at phase locking.

Figure 27:
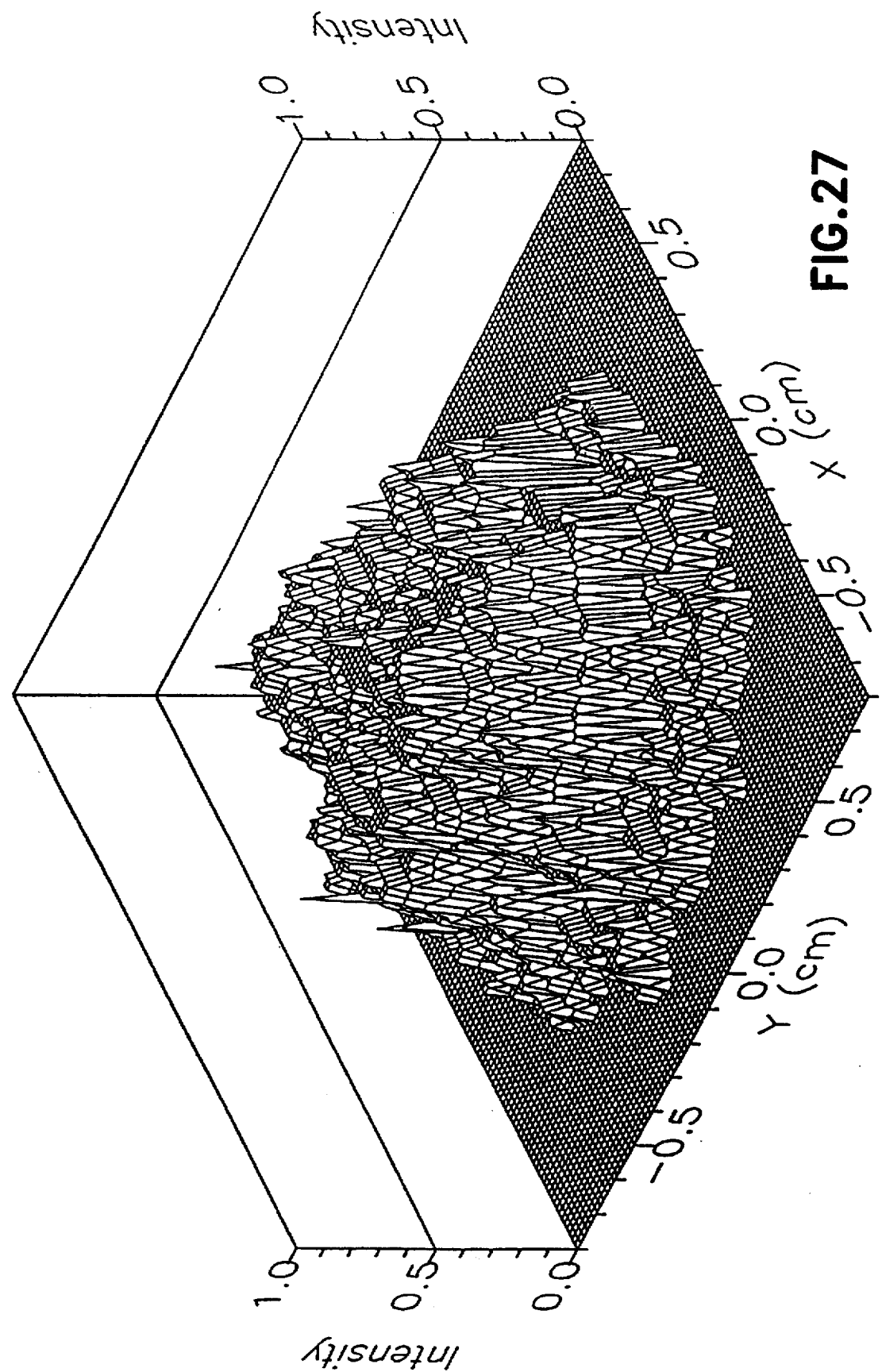
FIG. 27, is a computer re-generated profile of the measured combined output beam from an 8 slot radial array laser system.

When stacked together in the near field, a single non-polarized symmetric profile was observed, as depicted in FIG. 27. Upon focusing, these combined beamlets generated a single uniform spot having a minimum diameter considerably smaller than the diffraction limit of any of the individual beamlets. The mechanism by which these non-phase-locked beamlets can be focused to such a fine single spot can be understood with the aid of FIG. 28.

By virtue of the azimuthal radial array geometry and the common confocal resonator, all beamlets propagate parallel to the optic axis and therefore focus to a common spot. However, because of the aspect ratio, each focused beamlet generates an oblong spot having its major axis orthogonal to its near-field profile. Since the beamlets are not phase locked, pairs with common orientation merge and their intensities add to produce a composite focus featuring 4 superposed oblong spots oriented a 45 degree intervals. As such, the cross-sectional profile becomes much more symmetric and uniform than any of the individual beamlets.

Figure 28A:
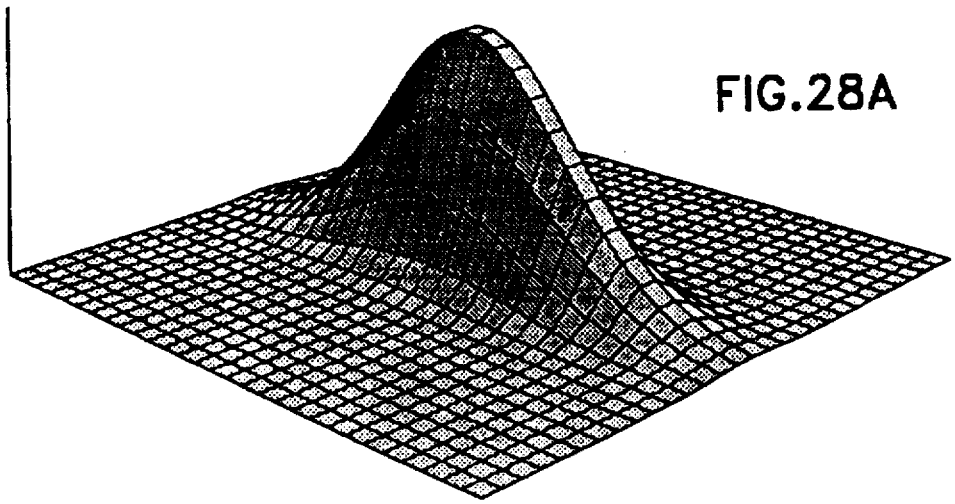
FIG. 28, is a computer generated simulation of the radial beam stacking phenomenon characteristic of the radial array laser geometry, illustrating the focal spot smoothing and narrowing effect inherent in the structure.

The beneficial effects derived from this phenomenon of "radial beam stacking" of multiple beamlets (N) is more fully apparent in the computer simulation of FIG. 28. The upper diagram of FIG. 28a illustrates the case where only 2 beamlets (is. N=2) are stacked parallel to each other. As can be seen, the composite intensity profile is very broad and still exhibits the enormous azimuthal asymmetry characteristic of large aspect ratio, wide slab devices.

Figure 28B:
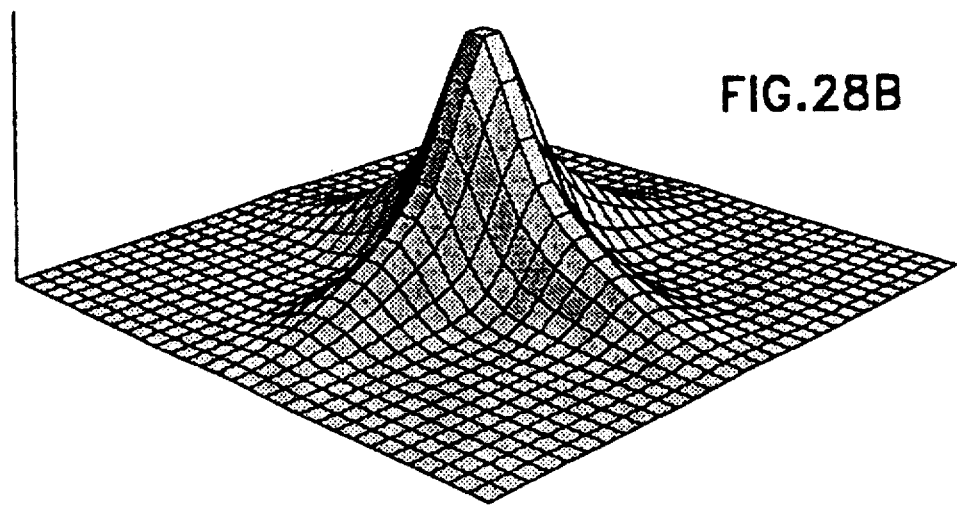
Figure 28C:
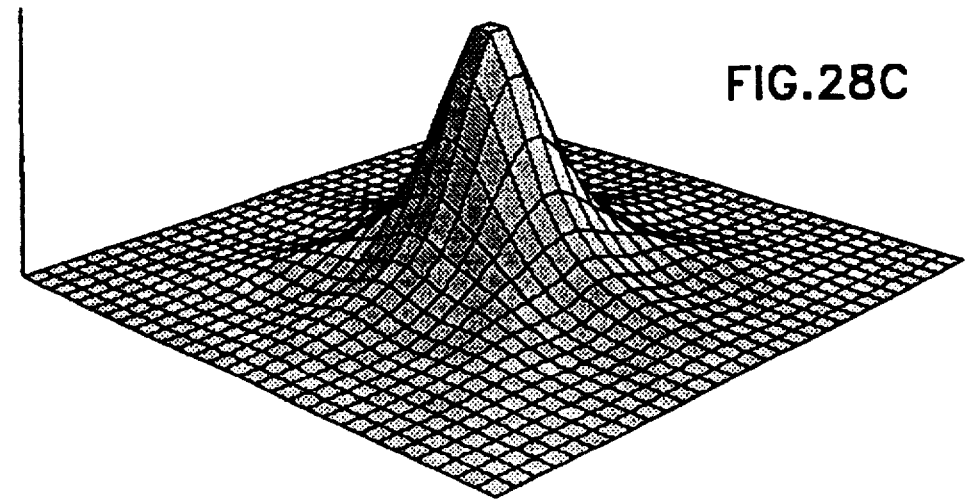

However, the much more symmetric and uniform intensity profile obtained when only 4 beamlets are stacked in a radial manner is clearly evident in FIG. 28b. FIG. 28c, depicting the radial stacking of 8 beamlets, documents that composite beam quality increases rapidly as the number of beamlets is increased because of the smoothing and compensating effect inherent in constructing the final beam profile from a multiplicity of smaller beamlets azimuthally averaged around the periphery.

FOCAL SPOT NARROWING

It is further apparent from the composite intensity diagrams b and C of FIG. 28, that radial beam stacking changes the focal intensity profile dramatically, even in the case of non-phase-locked radial array laser operation. Specifically, there is a significant focal spot size reduction associated with the radial stacking of incoherent beams having non-unity aspect ratios, since only the radiation within the intense central regions of the beamlets add together, while the outer low intensity wing regions do not.

It follows intuitively from this examination, that the radial stacking of a very large number of "coherent beamlets" derived from a multi-channel phase-locked radial array laser also provides a composite output beam with exceptional uniformity and symmetry, but with much higher brightness, due to the constructive interference between each beamlet at the common focal point. A very bright beam of this type is ideally suited for high quality materials processing applications.

ADVANTAGES OF RADIAL ARRAY GEOMETRY

An additional and important advantage derived by stacking a larger number of beams in this radial manner is that nonuniformities in each beamlet are averaged over the central focal region, thereby yielding an exceptionally smooth resultant focal spot with clean edges. Even small changes in alignment during operation are sufficiently averaged to have negligible effect on the composite beam focal parameters. Construction and operation of the optical system is thus simpler and less costly.

It follows from the above scenario that the radial array geometry inherently produces an output beam that is highly symmetric, both in terms of polarization and intensity profile. There is consequently no preferred direction for processing. In view of the analysis above, even a non-phase-locked radial array laser structure performs particularly well in high quality cutting applications.

Although the proof-of-concept multi-channel laser structure represented in FIG. 26 was built with an electrode gap of 5 mm, more recent experiments with single slab devices has documented that improved energy extraction can be achieved with discharge gaps about ½ of this value. Also, from considerations of construction and utilization, electrodes longer than about 1 m are impractical. It follows therefore, that if a significant level of optical power is to be extracted from a diffusion cooled device, either the single slab laser electrode must be made very wide, or a multi-channel approach must be employed.

In this context, and from the results obtained in this study, it seems preferable to utilize a multi-channel radial array structure, rather than a single wide slab, because of the important enhancement in symmetry and focal spot reduction achieved through radial beamlet stacking. Also, the wider electrodes characteristic of high power slab lasers are prone to thermal distortion, with concomitant serious beam degradation, due to single-sided discharge heating. However, the circular symmetry and double-sided discharges inherent in the radial array structure, eliminates all such problems.

In principle, it should be feasible to stack incoherent asymmetric beams from a number of independent slab lasers in a similar radial manner, and thereby achieve the same brightness enhancement as is observed with the radial array structure. However, the approach is not practical, not only because of the additional optics required, but more importantly because of the concomitant difficulty of retaining combined co-linearity and stability in such a distributed system. In contrast, the radial geometry and common optical extraction system, synonymous with the radial array structure, inherently provide these necessary beam stacking characteristics.

Another important factor to be considered in regard to the usefulness of the radial array geometry in laser construction, is the available laser power that can be extracted from a given volume. Specifically, the radial array structure utilizes the full cross-section of the containment vessel housing the electrode system, rather than just a single narrow slot across its diameter, as is the case with a single wide slab device. As such, over an order of magnitude more laser output power is achieved for the same overall cross-sectional dimension. Thus, much smaller and higher power lasers can be derived through use of the unique radial array concept.

I claim:

1. A laser system comprising:
   an optical cavity;
   plural slabs of laser excitation media, each slab being elongated in a first direction and forming a slab gain channel, the plural slabs of laser excitation media forming an array of gain channels positioned within the optical cavity;
   means attached to each slab of laser excitation media for cooling of the laser excitation media;
   optical extraction means attached to each slab of laser excitation media for extraction of optical energy from the slabs of laser excitation media;
   a source of laser excitation energy for exciting the laser excitation media; and
   a resonant RF cavity circumvolving said array of gain channels;
   means for pumping laser excitation energy from the source of excitation energy into the resonant RF cavity; and
   a plurality of low impedance magnetic elements for matched coupling of laser excitation energy from the resonant RF cavity to each of the slabs of laser excitation media contained within the optical cavity, thereby providing multi-channel uniform power distribution.

2. The laser system of claim 1 in which the slabs of laser excitation media are confined by pairs of electrodes defining narrow-gap gas discharge regions and each pair of electrodes forms a transmission line.

3. The laser system of claim 2 in which the slabs of laser excitation media form a radial array and the resonant RF cavity is a coaxial cavity formed between inner and outer cylindrical electrical conductors, the slabs of laser excitation media being contained within the inner cylinder.

4. The laser system of claim 2 further including means at the end of each slab of laser excitation media to couple electrical energy back into the resonant RF cavity and provide an impedance matched termination of the transmission lines formed by the electrodes, whereby upon excitation of the electrodes a travelling wave is formed.

5. The laser system of claim 2 in which the resonant cavity is formed between inner and outer cylindrical electrical conductors, the slabs of laser excitation media form a radial array mounted inside the optical RF cavity, and in which the source of laser excitation energy comprises:
   a pair of co-axial re-entrant capacitatively loaded concentric resonant RF cavities; and
   a vacuum tube electrically connected to the interior of the pair of co-axial re-entrant capacitatively loaded concentric resonant RF cavities, thereby forming an rf oscillator.

6. The laser system of claim 2 in which the source of laser excitation energy is mounted at one end of the resonant RF cavity.

7. The laser system of claim 2 in which the source of laser excitation energy is a cavity-coupled, self-excited, vacuum tube oscillator.

8. The laser system of claim 7 further including means to provide multiple co-axial feeder line output energy transfer from the vacuum tube oscillator to the co-axial resonant RF cavity.

9. The laser system of claim 7 in which the source of laser excitation energy is formed from a multiplicity of vacuum tubes mounted on the side of the resonant RF cavity.

10. The laser system of claim 2 in which the source of laser excitation energy is a magnetron with multiple feeder lines to the co-axial resonant RF cavity.

11. The laser system of claim 2 in which the vacuum tube oscillator is integrated within the co-axial resonant RF cavity.

12. The laser system of claim 11 in which the source of laser excitation energy is mounted on the side of the resonant RF cavity and forms a T.

13. The laser system of claim 2 in which the resonant RF cavity is formed between inner and outer cylindrical electrical conductors, the slabs of laser excitation media form a radial array mounted inside the optical cavity, and in which the source of laser excitation energy comprises:
   a toroidal vacuum tube disposed within the resonant RF cavity and extending circumferentially about the radial array.

14. The laser system of claim 2 in which the electrical circuit is a stripline resonator.

15. The laser system of claim 2 in which each of the slabs of laser excitation media produces an individual beamlet and further including means to compact the individual beamlets into a single beam.

16. The laser system of claim 1 in which the slabs of laser excitation media form an array of parallel slab gain channels.

17. The laser system of claim 1 in which the slabs of laser excitation media form a radial array having a common central axis and the resonant RF cavity has an axis of symmetry coinciding with the common central axis.

18. The laser system of claim 1 in which each of the plural slabs of laser excitation media is confined between a pair of electrodes and the source of laser excitation energy includes plural magnetic loops, at least one for each electrode, disposed at least at one end of the resonant RF cavity, thereby providing independent laser excitation energy to each electrode, and means to provide uniform standing wave voltage distribution along the electrodes.

19. The laser system of claim 1 in which the optical extraction system has an optical axis and the optical axis coincides with the common central axis of the slabs of laser excitation media.

20. The laser system of claim 1 further comprising:
phase lock means for providing phase-locking of the laser energy extracted simultaneously from the plural slabs of laser excitation media, the phase lock means including means for injecting a reference oscillator beam into the plural slabs of laser excitation media, thereby providing injection phase-locking of output beams extracted from the plural slabs of laser excitation media.

21. The laser system of claim 20 in which the plural slabs of laser excitation media are arranged radially about a common central axis, and the reference oscillator beam is produced by a central core of laser excitation media lying along the common central axis.

22. The laser system of claim 20 in which the optical extraction system is an unstable resonator.

23. The laser system of claim 20 in which the optical extraction system is a toric resonator.

24. The laser system of claim 20 in which the optical extraction system is an annular coupled concave-convex stable resonator.

25. The laser system of claim 20 in which the optical extraction system is a stable iris-coupled toric resonator.

26. The laser system of claim 20 in which the optical extraction system is a hybrid stable-unstable MOPA resonator.

27. The laser system of claim 1 in which the optical extraction system is an unstable resonator.

28. The laser system of claim 1 in which the optical extraction system is a toric resonator.

29. The laser system of claim 1 in which the slabs of laser excitation media form multiple concentric radial arrays.

30. The laser system of claim 1 in which each of the slabs of laser excitation media is confined between a pair of electrodes, one of each pair of electrodes extending inward from an outer conducting ring and the other of each of the pairs of electrodes being mounted on the outer conducting ring but being insulated from the outer conducting ring and the source of laser excitation energy includes means of a stripline cavity resonator.

31. The laser system of claim 1 in which each of the slabs of laser excitation media is confined between a pair of electrodes, one of each pair of electrodes extending outward from an inner conducting ring and the other of each of the pairs of electrodes extending inward from an outer conducting ring and the source of laser excitation energy includes means to provide laser excitation in the form of pulses.

32. The laser system of claim 1 in which the excitation media is selected from the group comprising carbon dioxide, carbon monoxide, nitrogen, xenon chloride or krypton fluoride.

33. A laser system comprising:
an optical cavity;
at least one slab of gaseous laser excitation media, each slab being elongated along an optical axis and forming a slab gain channel within the optical cavity;
means attached to each slab of laser excitation media for cooling of the laser excitation media;
optical extraction means attached to each slab of laser excitation media for extraction of optical energy from each slab of laser excitation media;
a source of laser excitation energy for exciting the laser excitation media, and
a resonant cavity circumvolving the optical cavity; means for pumping laser excitation energy from the source of excitation energy into the resonant RF cavity; and
a plurality of low impedance magnetic elements for matched coupling of laser excitation energy from the resonant RF cavity to each of the each of the slabs of laser excitation media contained within the optical cavity, thereby providing multi-channel uniform power distribution.

34. The laser system of claim 33 in which there are plural slabs of laser excitation media excited by the source of laser excitation energy.

35. The laser system of claim 33 in which the electrical circuit includes a resonant RF cavity formed within a conducting enclosure.

36. The laser system of claim 33 in which the electrical circuit is a stripline resonator.

37. The laser system of claim 33 in which each slab of laser excitation media is confined by a pair of electrodes defining a gas discharge region therebetween, the pair of electrodes forming a transmission line.

38. The laser system of claim 3 in which each of the slabs of laser excitation media is confined between a pair of electrodes and one of each of the pairs of electrodes extends inward from an outer conducting ring and the other of each of the pairs of electrodes is mounted on the outer conducting ring but insulated from the outer conducting ring and the source of laser excitation energy includes means to provide laser excitation in the form of pulses.

39. The laser system of claim 3 in which each of the slabs of laser excitation media is confined between a pair of electrodes, one of each pair of electrodes extending outward from an inner conducting ring and the other of each of the pairs of electrodes extending inward from an outer conducting ring and the source of laser excitation energy includes means to provide laser excitation in the form of pulses.

40. A laser system comprising:
at least one slab of excitation media, each slab being elongated in a first direction and forming a slab gain channel;
means attached to each slab for RF excitation and cooling of the laser excitation media;
optical extraction means attached to each slab of laser excitation media for extraction of optical energy from each slab of laser excitation media;
means for optical energy extraction including an annular-coupled concave-convex stable resonator.

41. A laser system of claim 40 in which the optical extraction means includes a stable iris-coupled toric resonator.

42. A laser system of claim 40 in which the optical extraction means includes a hybrid stable-unstable MOPA resonator.

43. A laser system of claims 40 through 42 in which the means attached for RF excitation includes a Magnetron.

* * * * *